(12) United States Patent
Nomura et al.

(10) Patent No.: US 6,728,046 B2
(45) Date of Patent: Apr. 27, 2004

(54) STOPPER STRUCTURE FOR LENS BARREL ASSEMBLY

(75) Inventors: Hiroshi Nomura, Saitama (JP);
Takamitsu Sasaki, Saitama (JP);
Kazunori Ishizuka, Kanagawa (JP);
Maiko Takashima, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/101,753

(22) Filed: Mar. 21, 2002

(65) Prior Publication Data

US 2002/0135900 A1 Sep. 26, 2002

(30) Foreign Application Priority Data

Mar. 22, 2001 (JP) .......................... 2001-082093

(51) Int. Cl.[7] .............................. G02B 15/14; G02B 7/02
(52) U.S. Cl. ..................... 359/702; 359/829; 359/694
(58) Field of Search ................... 359/694, 702, 359/703, 704, 706, 829

(56) References Cited

U.S. PATENT DOCUMENTS

| | | |
|---|---|---|
| 4,227,792 A | 10/1980 | Rentschler |
| 4,390,262 A | 6/1983 | Hirohata et al. |
| 4,416,527 A | 11/1983 | Okura |
| 4,426,145 A | 1/1984 | Hashimoto |
| 4,484,800 A | 11/1984 | Tamura |
| 4,524,585 A | 6/1985 | Coll et al. ................ 60/562 |
| 4,576,446 A | 3/1986 | Kamata |
| 4,595,081 A | 6/1986 | Parsons |
| 4,662,241 A | 5/1987 | Edwards |
| 4,834,514 A | 5/1989 | Atsuta et al. |
| 4,839,680 A | 6/1989 | Amada et al. |
| 4,922,274 A | 5/1990 | Yamamoto et al. |
| 4,971,427 A | 11/1990 | Takamura et al. |
| 4,993,815 A | 2/1991 | Yamazaki et al. |
| 5,037,187 A | 8/1991 | Oda et al. |
| 5,126,883 A | 6/1992 | Sato et al. |
| 5,164,757 A | 11/1992 | Nomura ..................... 396/80 |
| 5,166,829 A | 11/1992 | Iizuka |
| 5,177,638 A | 1/1993 | Emura et al. |
| 5,196,963 A | 3/1993 | Sato et al. |
| 5,231,449 A | 7/1993 | Nomura ..................... 396/542 |
| 5,241,422 A | 8/1993 | Shimada et al. |
| 5,262,898 A | 11/1993 | Nomura ..................... 359/700 |
| 5,268,794 A | 12/1993 | Chan |
| 5,270,868 A | 12/1993 | Nomura ..................... 359/700 |
| 5,301,066 A | 4/1994 | Higuchi et al. |
| 5,461,443 A | 10/1995 | Nakayama et al. |
| 5,488,513 A | 1/1996 | Tanaka ..................... 359/699 |
| 5,559,571 A | 9/1996 | Miyamoto et al. |
| 5,589,987 A | 12/1996 | Tanaka |
| 5,646,790 A | 7/1997 | Kohmoto et al. ........... 359/823 |
| 5,701,208 A | 12/1997 | Sato et al. |
| 5,708,533 A | 1/1998 | Hamasaki ................... 359/700 |

(List continued on next page.)

FOREIGN PATENT DOCUMENTS

| | | | |
|---|---|---|---|
| JP | 04340907 A | * 11/1992 | ........... G02B/7/02 |
| JP | 6-298072 A | 10/1994 | |
| JP | 11-512681 A | 11/1999 | |

*Primary Examiner*—Ricky Mack
(74) *Attorney, Agent, or Firm*—Greenblum & Bernstein, P.L.C.

(57) ABSTRACT

A stopper structure for use in a lens barrel assembly, the lens barrel assembly having a helicoid ring which includes a male helicoid, on the outer periphery of the helicoid ring, for engaging with a female helicoid on an inner periphery of a fixed barrel secured to a camera body; and gear teeth formed along the male helicoids to extend between the male helicoids and arranged in a circumferential direction about an optical axis, the helicoid ring moving along the optical axis while been driven by a pinion which is engaged with the gear teeth; wherein the stopper structure includes a stopper member which engages with at least one tooth of the gear teeth in order to prevent rotation of the helicoid ring.

9 Claims, 40 Drawing Sheets

U.S. PATENT DOCUMENTS

| | | | |
|---|---|---|---|
| 5,739,962 A | 4/1998 | Asakura et al. | |
| 5,774,266 A | 6/1998 | Otani et al. | |
| 5,774,748 A | 6/1998 | Ito et al. | 396/80 |
| 5,793,537 A | 8/1998 | Nomura et al. | 359/700 |
| 5,812,889 A | 9/1998 | Nomura et al. | |
| 5,842,057 A | 11/1998 | Nomura et al. | 396/87 |
| 5,870,232 A | 2/1999 | Tsuji et al. | |
| 5,892,998 A | 4/1999 | Kodaira et al. | |
| 5,933,285 A | 8/1999 | Sato et al. | |
| 5,991,097 A | 11/1999 | Nomura et al. | 359/700 |
| 6,012,288 A | 1/2000 | Gualdoni et al. | 60/562 |
| 6,055,116 A | 4/2000 | Nomura et al. | 359/822 |
| 6,069,745 A | 5/2000 | Fujii et al. | |
| 6,089,760 A | 7/2000 | Terada | |
| 6,115,189 A | 9/2000 | Nomura et al. | 359/694 |
| 6,118,666 A | 9/2000 | Aoki et al. | |
| 6,125,237 A | 9/2000 | Park | |
| 6,160,670 A | 12/2000 | Nakayama et al. | |
| 6,176,627 B1 | 1/2001 | Suh | |
| 6,195,211 B1 | 2/2001 | Iwasaki | |
| 6,369,955 B1 | 4/2002 | Enomoto et al. | |
| 6,369,956 B1 | 4/2002 | Nomura et al. | 359/700 |
| 6,369,962 B1 | 4/2002 | Nomura et al. | 359/822 |
| 6,392,828 B1 | 5/2002 | Nomura et al. | 359/827 |
| 6,424,469 B2 | 7/2002 | Hirai | |
| 6,429,979 B2 | 8/2002 | Enomoto et al. | |
| 6,437,922 B2 | 8/2002 | Enomoto et al. | |
| 6,437,924 B1 | 8/2002 | Azegami | |
| 6,456,442 B1 | 9/2002 | Enomoto | |
| 6,456,445 B2 | 9/2002 | Nomura et al. | |
| 6,469,840 B2 | 10/2002 | Nomura et al. | |
| 6,469,841 B2 | 10/2002 | Nomura et al. | |
| 6,493,511 B2 | 12/2002 | Sato | |
| 6,512,638 B2 | 1/2003 | Sato et al. | |
| 6,522,478 B2 | 2/2003 | Nomura et al. | |
| 6,522,481 B2 | 2/2003 | Nomura et al. | |
| 6,522,482 B2 | 2/2003 | Nomura et al. | |
| 6,552,478 B2 | 4/2003 | Derraa | |
| 6,552,481 B2 | 4/2003 | Furusawa et al. | |
| 2002/0012178 A1 | 1/2002 | Noguchi | |
| 2002/0036836 A1 | 3/2002 | Hagimori | |

\* cited by examiner

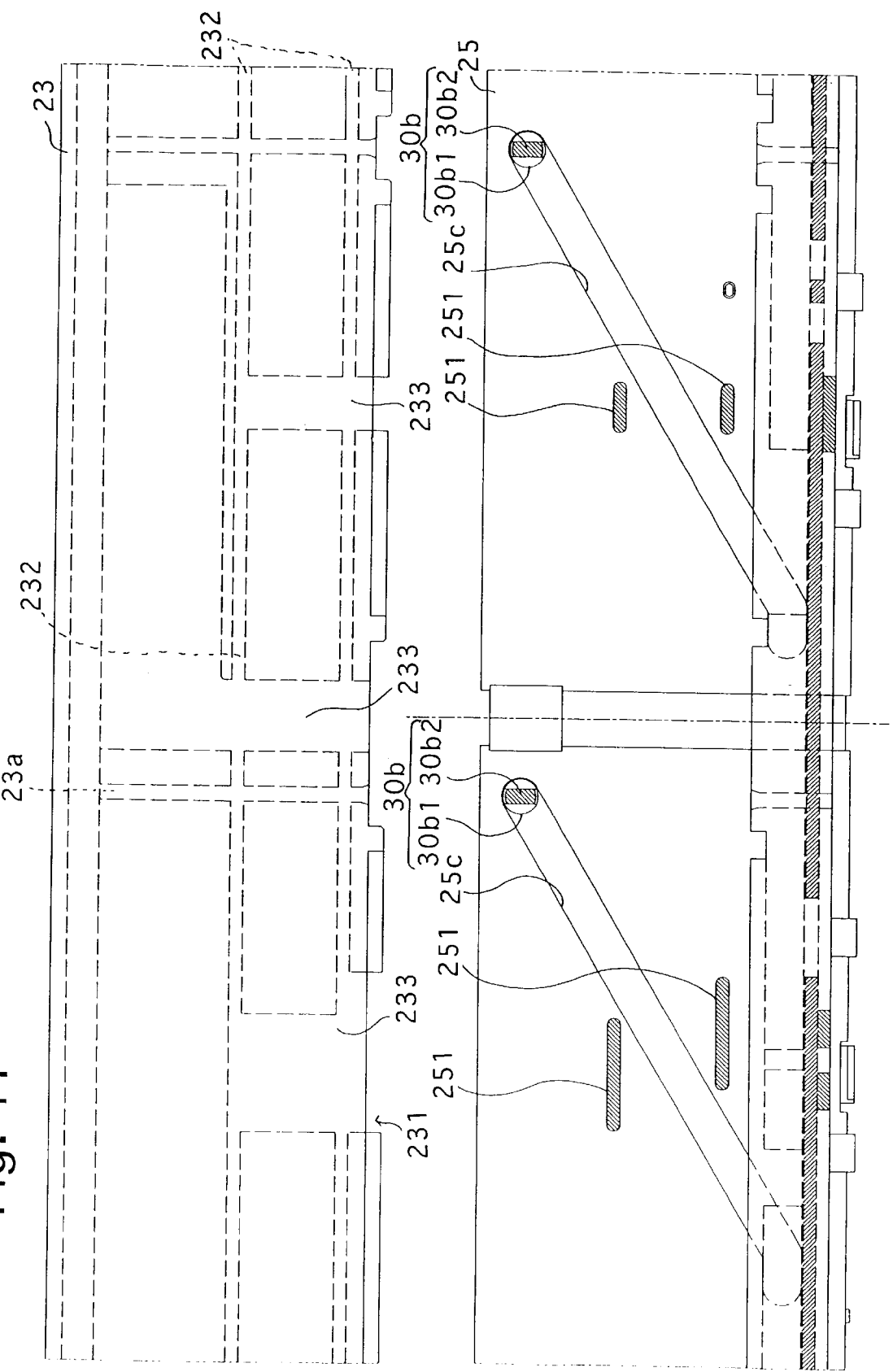

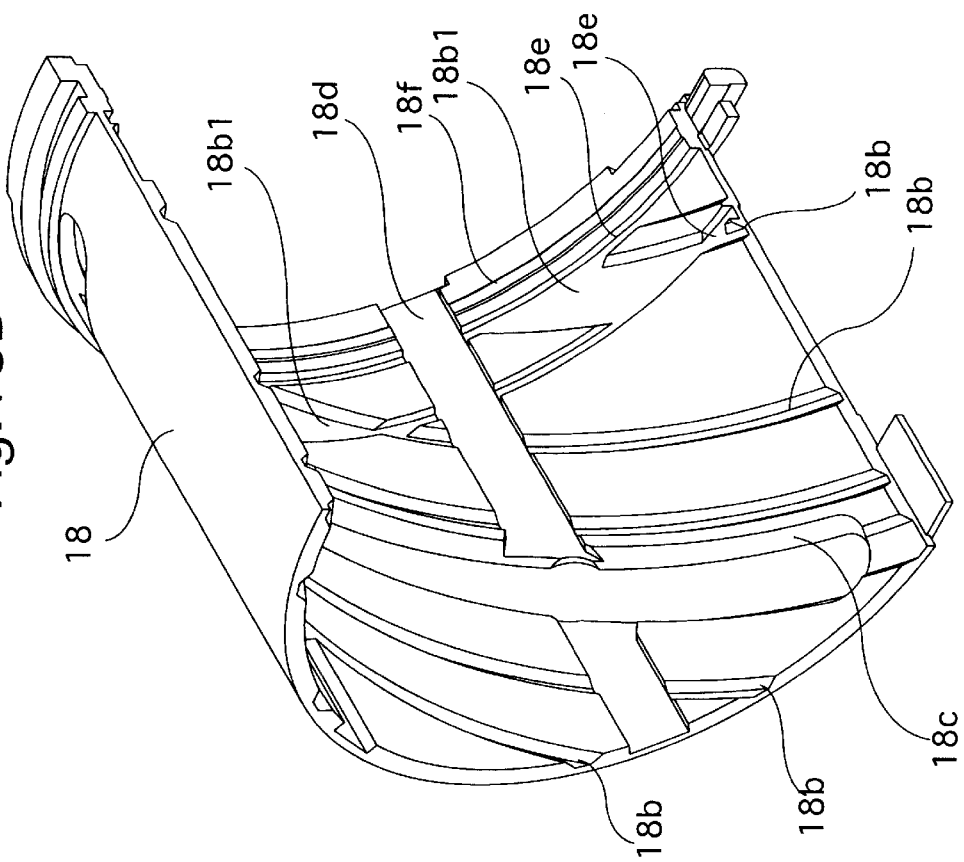
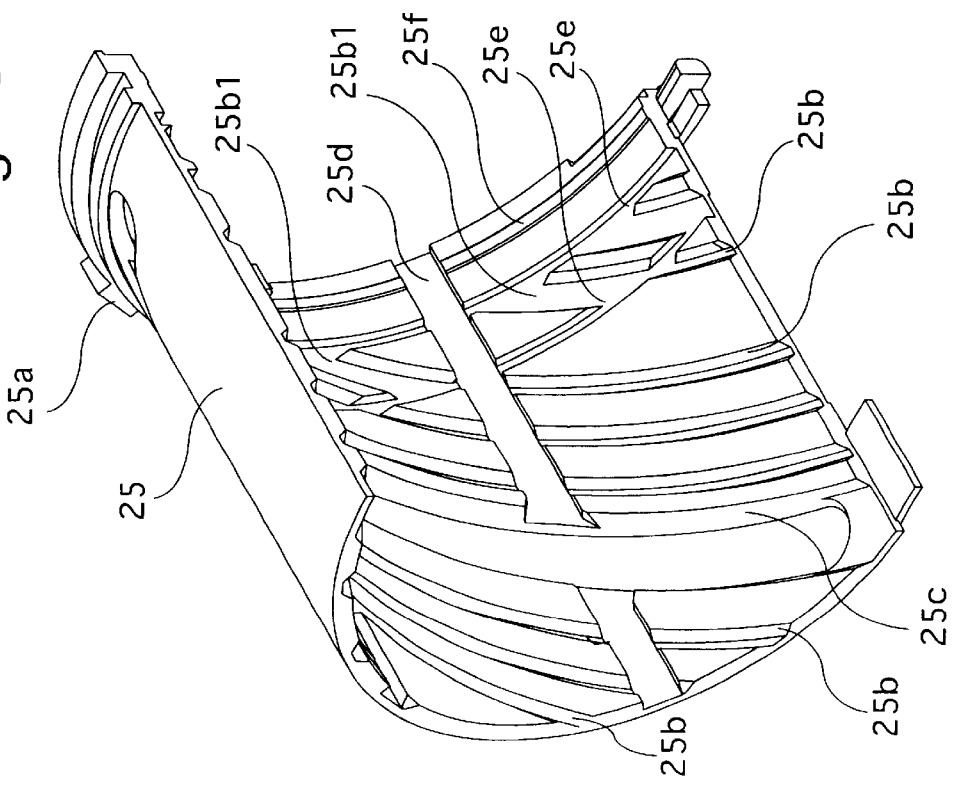

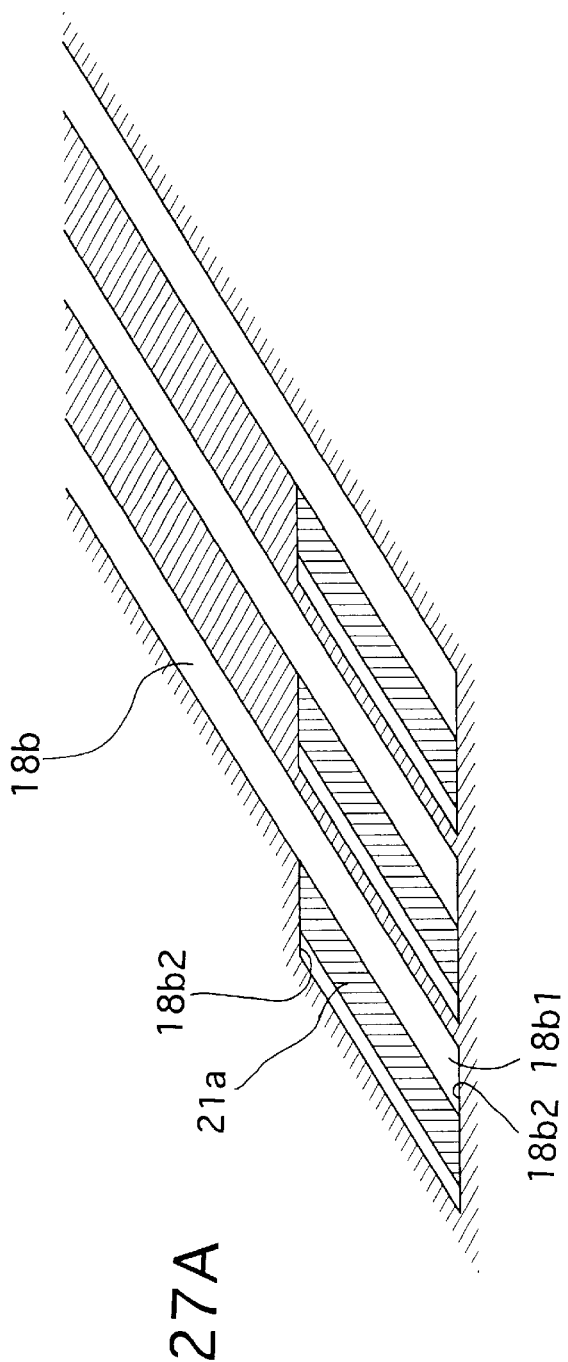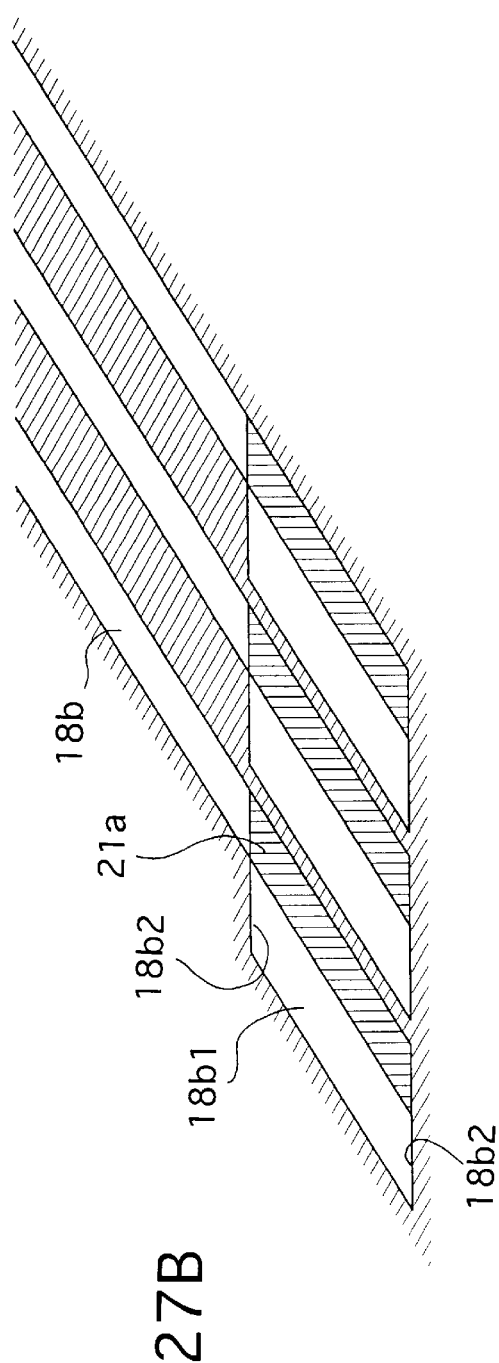

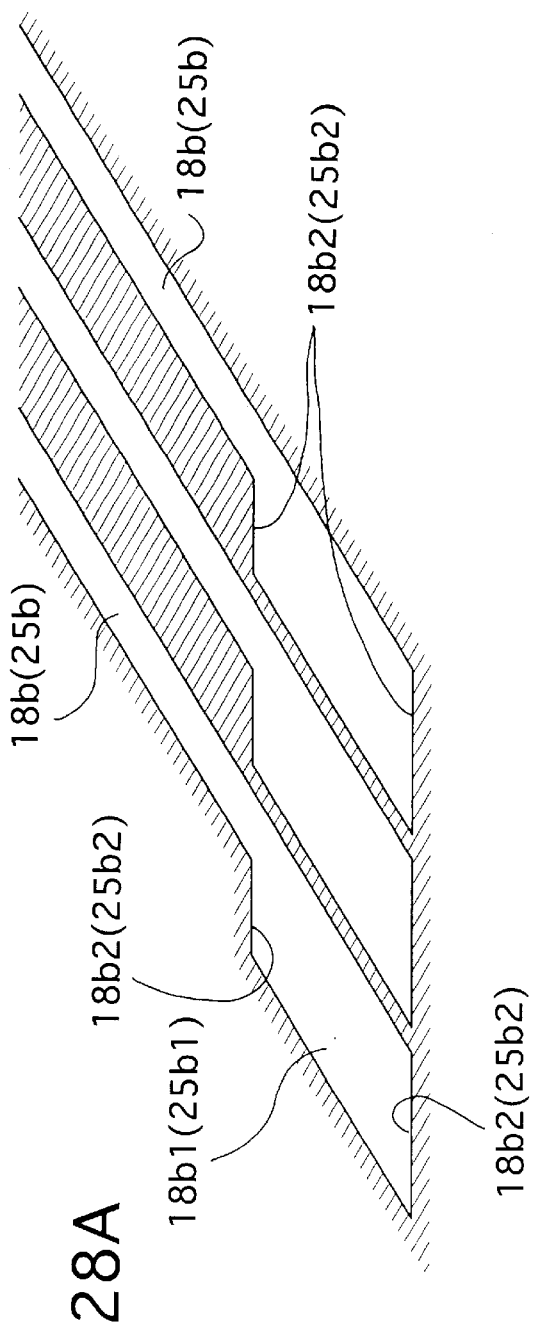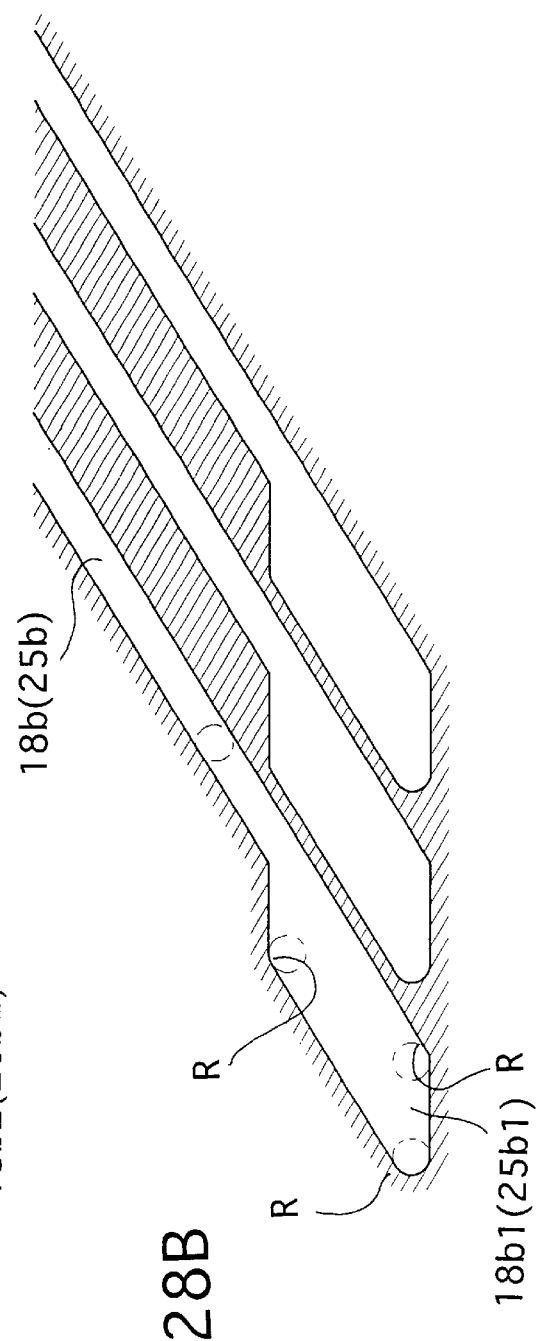

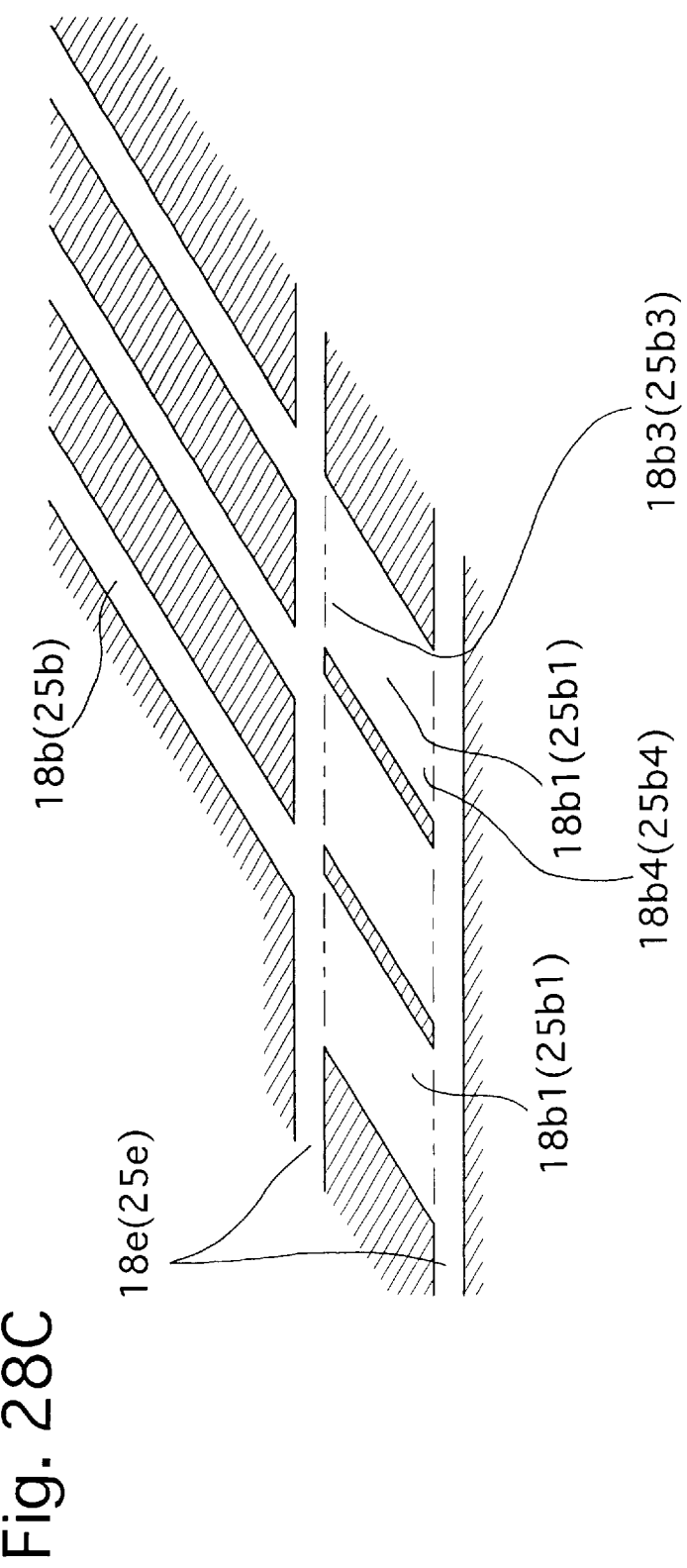

STOPPER STRUCTURE FOR LENS BARREL ASSEMBLY

BACKGROUND OF THE INVENTION

1. Field of the Invention

The present invention relates to a stopper structure for use with a lens barrel assembly.

2. Description of the Related Art

Three-stage-extension zoom lens barrel assemblies are known as a common lens barrel structure for use in conventional zoom lenses of compact cameras. One type of such conventional three-stage-extension zoom lens barrel assemblies includes a fixed barrel secured to a camera body and two lens barrels retained within the fixed barrel. The fixed barrel and one of the two barrels that is directly inside the fixed barrel are connected to each other via helicoids whereas the other of the two barrels that is placed inside the first barrel is connected to the first barrel via a cam structure. Alternatively, some multi-stage-extension zoom lens barrel assemblies use a helicoid structure in all of the connections between lens barrels to move the connected lens barrels relative to each other.

These multi-stage-extension zoom lens barrel assemblies employ a stopper ring placed over a lens barrel for preventing lens barrels from being advanced past the normal operative position to come off the barrel assembly. When it is necessary to disassemble the barrel, however, the stopper ring must first be removed. This makes the disassembly process difficult.

SUMMARY OF THE INVENTION

In view of the above problem of the conventional multi-stage-extension zoom lens barrel assembly, a stopper structure is provided which can prevent the lens barrels from coming off and requires fewer components, thereby facilitating disassembly of the lens barrel assembly. A stopper structure is also provided for use in a lens barrel assembly which can prevent components of the lens barrel assembly, such as a flexible printed circuit board, from interfering with the stopper structure.

For example, in an embodiment, a stopper structure for use in a lens barrel assembly is provided, the lens barrel assembly including a helicoid ring, the helicoid ring including a male helicoid provided on an outer periphery of the helicoid ring for engaging with a female helicoid provided on an inner periphery of a fixed barrel secured to a camera body; and gear teeth formed along the male helicoids to extend between the male helicoids, the gear teeth being arranged in a circumferential direction about an optical axis, the helicoid ring moving along the optical axis while been driven by a pinion which is engaged with the gear teeth. The stopper structure includes a stopper member which engages with at least one tooth of the gear teeth in order to prevent rotation of the helicoid ring.

Rotation of the helicoid ring can be prevented when the helicoid ring advances as far as possible in the optical axis direction and the at least one tooth comes into engagement with the stopper member.

It is desirable for the stopper member to be removably attached to an outer surface of the fixed barrel.

It is desirable for a portion of the stopper member, which engages with the at least tooth of the gear teeth of the helicoid ring, to project into the fixed barrel.

An end tooth of the gear teeth can constitute the at least one tooth.

It is desirable for a stopper space to be provided in the vicinity of the end of the gear teeth to ensure a large contact width between the stopper member and the at least one tooth.

The stopper structure for use in a lens barrel assembly can further include a barrel which includes an electric member that moves along the optical axis without rotating as the helicoid ring rotates and moves along the optical axis; a flexible printed circuit board for connecting the shutter mechanism to an external control circuit arranged outside the lens barrel assembly, the circuit board including folds and being arranged along the optical axis and along an outer periphery of the helicoid ring; and an interference-preventing projection for sliding against the flexible printed circuit board to lift the flexible printed circuit in an outward radial direction, with respect to a rotational center of the barrel, in order to prevent the at least one tooth of the helicoid ring interfering with the flexible printed circuit board as the helicoid ring rotates and moves along the optical axis.

The electric member can be a shutter unit or a diaphragm unit.

The present disclosure relates to subject matter contained in Japanese Patent Application No. 2001-82093 (filed on Mar. 22, 2001) which is expressly incorporated herein by reference in its entirety.

BRIEF DESCRIPTION OF THE DRAWINGS

The present invention will be discussed below in detail with reference to the accompanying drawings, in which:

FIG. 17 is a developed view showing engagement of the second outer barrel, the second helicoid ring, the second linear guide ring and the guide heads, in the assembly/disassembly position of the zoom lens barrel assembly with the second outer barrel removed;

FIG. 18A is a perspective view showing a longitudinal cross-section of the second linear guide ring 25 of the zoom lens barrel assembly;

FIG. 18B is a perspective view showing a longitudinal cross-section of the third linear guide ring 18 of the zoom lens barrel assembly;

FIG. 27A is an explanatory view showing engagement of the female helicoids and the helicoid slip section of the first linear guide ring, and the male helicoids of the second helicoid ring of the zoom lens barrel assembly when the lens barrel assembly is in the retracted state;

FIG. 27B is an explanatory view showing engagement of the female helicoids and the helicoid slip section of the first linear guide ring, and the male helicoids of the second helicoid ring of the zoom lens barrel assembly when the lens barrel assembly is in the slip section boundary section;

FIG. 28A is an explanatory view showing profile of the female helicoids and the helicoid slip section of the first linear guide ring;

FIG. 28B is an explanatory view illustrating the problem that arises upon manufacturing of a mold;

FIG. 28C is an explanatory view illustrating a solution to the problem proposed by an embodiment of the present invention;

DETAILED DESCRIPTION OF THE PREFERRED EMBODIMENTS

Figure 1:
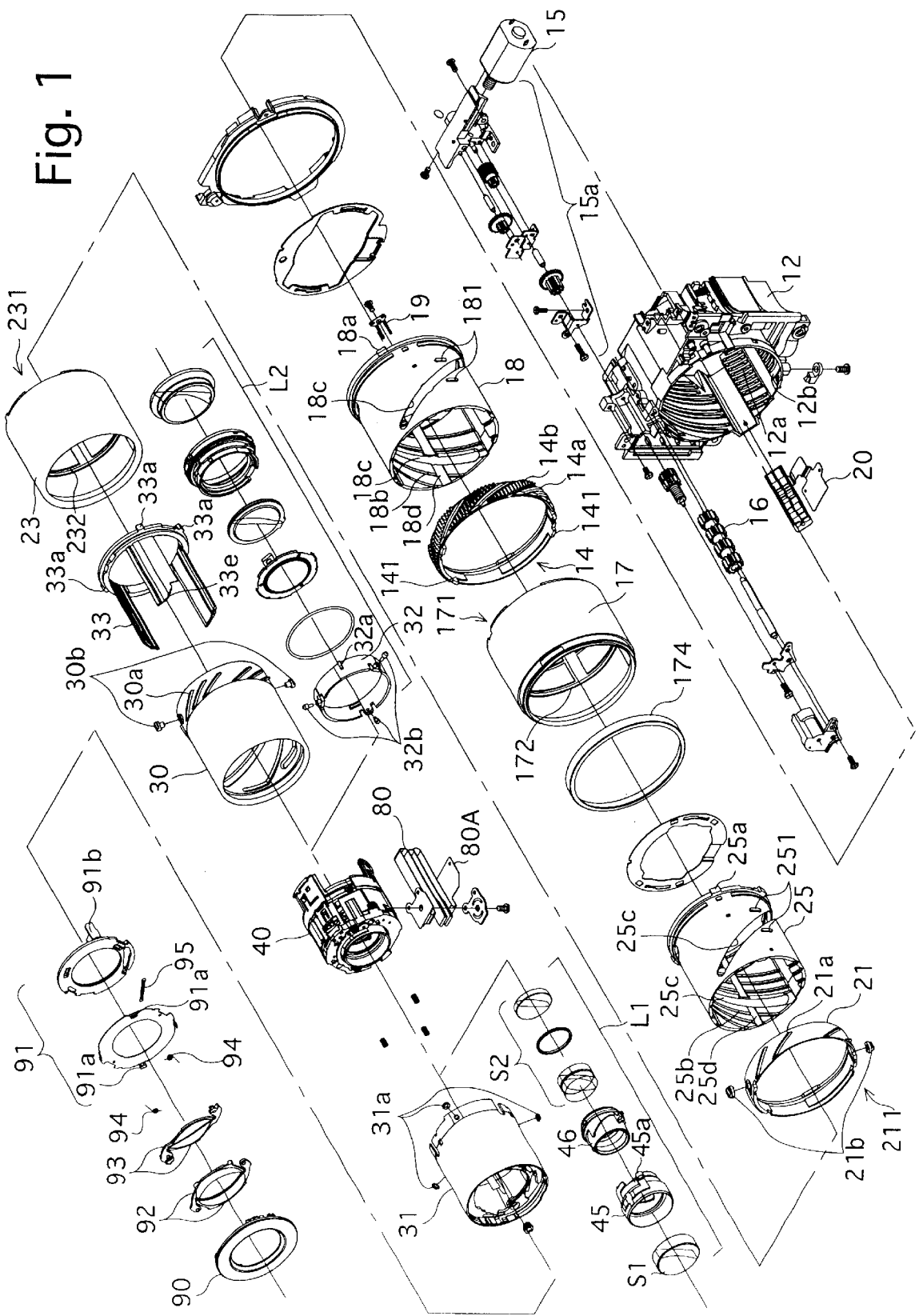
FIG. 1 is an exploded perspective view showing components of an embodiment of a zoom lens barrel assembly of the present invention.

The present invention will now be described in detail hereinafter with reference to the accompanying drawings. In one embodiment, the present invention is applied to a four-stage-extension zoom lens barrel assembly (multi-stage-extension zoom lens barrel assembly).

As shown in FIGS. 1 through 5, the zoom lens barrel assembly is constructed as a four-stage-extension zoom lens barrel assembly and includes a fixed barrel (rearmost barrel) 12 secured to a camera body, and a four-stage barrel unit which is retained in the fixed barrel 12 and advances and retreats along the optical axis relative to the fixed barrel 12. The four-stage lens unit includes a first outer barrel 17 which is the rearmost barrel, a second outer barrel 23 which is the second rearmost barrel, a third outer barrel 30 which is the third rearmost barrel and is constructed as a cam ring, and a fourth outer barrel (frontmost barrel) 31 which is the fourth rearmost barrel and serves as a lens-retaining barrel.

In the zoom lens barrel assembly, the fixed barrel 12 is connected to the first outer barrel 17, which in turn is connected to the second outer barrel 23, which in turn is connected to the third outer barrel 30, with each connection provided by a helicoid structure (mechanism). The helicoid mechanisms allow the barrels 17, 23 and 30 to extend outward from, or into, each other. The fourth outer barrel 31 is connected to the third outer barrel 30 through a cam structure.

In the zoom lens barrel assembly of the present embodiment, the first outer barrel 17 and the second outer barrel 23 are made separately from helicoid rings. Furthermore, the zoom lens barrel assembly is constructed so as to be extended past the telephoto extremity position, which is the most extended position of the barrel assembly in normal operation, to an assembly/disassembly position, at which the first outer barrel 17 and the second outer barrel 23 can be removed from and mounted onto the zoom lens barrel assembly. In this embodiment, the barrel assembly is brought into the assembly/disassembly position by rotating it to an additional rotation angle of 8° from the telephoto extremity position.

Lens barriers 92 and 93 are mounted on the fourth outer barrel 31 in the front portion thereof. The lens barriers 92 and 93 are opened and closed as the fourth outer barrel 31 and the third outer barrel 30 move along the optical axis relative to each other when the barrel assembly moves between the retracted position and the minimally extended photographing position (which corresponds to the wide-angle extremity position in this embodiment).

In the zoom lens barrel assembly of the present embodiment, the helicoid structure to move the second outer barrel 23 and the third outer barrel 30 includes a slip section which permits rotation of the second and the third outer barrels 23 and 30 but does not permit relative movement thereof along the optical axis when the lens barrel assembly moves between the retracted position and the wide-angle position. In other words, the path of the telescopic movement of the lens barrel assembly from the retracted position toward the wide-angle position includes a slip section in which the second outer barrel 23 and the third outer barrel 30 rotate at the same speed and do not move relative to each other along the optical axis. In the slip section, the first outer barrel 17 rotates while moving along the optical axis, whereas the fourth outer barrel 31 does not rotate but moves relative to the third outer barrel 30 along the optical axis. This relative movement between the fourth outer barrel 31 and the third outer barrel 30 along the optical axis causes opening/closing of the barriers 92 and 93.

The entire structure of the zoom lens barrel assembly will now be described with reference to FIGS. 1 through 7. Referring to FIG. 1, major components of the zoom lens barrel assembly are shown in an exploded view. Hereinafter, "front" refers to the direction toward an object to be photographed and "rear" refers to the direction toward the camera body (film).

Female helicoids 12a are formed on the inner periphery of the fixed barrel 12 which is secured to a camera body 11. The female helicoids 12a engage with male helicoids 14a formed on the outer periphery of a first helicoid ring 14. Arranged on the outside of the fixed barrel 12 is a pinion 16, which is rotated by a zooming motor 15. The pinion 16 engages with gear teeth 14b, which are formed on the outer periphery of the first helicoid ring 14 and extend along the male helicoids 14a where some of the male helicoids 14a have been removed (cut-away). The first outer barrel 17 is connected to the first helicoid ring 14 at the front end of the helicoid ring 14. The term pinion (16) refers to the smaller gear of a pair of gears in mesh with each other, wherein the term "gear and pinion" includes a "worm-wheel and worm" and a "bevel gear (bevel worm)", etc.

Engagement portions 141 (see FIGS. 1 and 34) formed on the front end of the first helicoid ring 14 engage with engagement portions 171 formed on the rear end of the first outer barrel 17, so that the first helicoid ring 14 integrally rotates with the first outer barrel 17. The engagement portions 141 and 171 can be brought into disengagable engagement by sliding the first helicoid ring 14 and the first outer barrel 17 along the optical axis toward each other when the first helicoid ring 14 and the first outer barrel 17 are in a predetermined relative rotational position (assembly/disassembly position). A first linear guide ring 18, which is supported within the first outer barrel 17, can be rotated relative to the first outer barrel 17 and moves along the optical axis together with the first outer barrel 17 (i.e., no relative displacement permitted along the optical axis). Linear guide projections 18a formed on the first linear guide ring 18 engage with respective linear guide slots 12b formed on the fixed barrel 12, so that the first linear guide ring 18, while being supported within the first outer barrel 17, can only move along the optical axis (i.e., can advance and retreat) and cannot rotate relative to the fixed barrel 12.

A pair of circumferential grooves 172 are formed on the inner periphery of the first outer barrel 17 and are separated from each other by a predetermined distance along the optical axis. A pair of keys 181, formed on the outer periphery of the first linear guide ring 18, engage with the respective circumferential grooves 172. Engagement of the keys 181 with the respective circumferential grooves 172 permits rotation of the first outer barrel 17 relative to the first linear guide ring 18 while preventing the relative movement between them along the optical axis.

Thus, upon activation of the zooming motor 15, a driving force therefrom is transmitted through a series of reduction gears 15a and the pinion 16 to the gear teeth 14b, to cause the first helicoid ring 14 to rotate. The rotation of the first helicoid ring 14 in turn causes the connected unit of the first helicoid ring 14, the first outer barrel 17 and the first linear guide ring 18, to advance and retreat along the optical axis. Consequently, the first helicoid ring 14, together with the first outer barrel 17, advances or retreats along the optical axis while rotating as the male helicoids 14a mesh with the female helicoids 12a, whereas the first linear guide ring 18 advances or retreats along the optical axis together with the first helicoid ring 14 and the first outer barrel 17 without rotating.

The engagement portions 141 and the engagement portions 171, and the keys 181 and the circumferential grooves 172, are respectively configured so that when the first helicoid ring 14 and the first outer barrel 17, and the first outer barrel 17 and the first linear guide ring 18, are in their respective predetermined relative rotational positions (assembly/disassembly positions), the first helicoid ring 14 and the first outer barrel 17, and the first outer barrel 17 and the first linear guide ring 18, can be moved along the optical axis toward and away from each other for engagement/disengagement.

The first helicoid ring 14, together with the first outer barrel 17, advances and retreats along the optical axis while rotating as the male helicoids 14a mesh with the female helicoids 12a, whereas the first linear guide ring 18 advances and retreats along the optical axis together with the first helicoid ring 14 and the first outer barrel 17 without rotating. A brush 19 and a code plate 20, which are secured to the first linear guide ring 18 and to the fixed barrel 12, respectively, detect predetermined stepped zoom positions (1 (Wide-extremity position) through 7 (Tele-extremity position)) of the first linear guide ring 18 along the optical axis with respect to the fixed barrel 12, wherein each of the stepped zoom positions are separated by a predetermined distance. A cosmetic ring 174 is secured to the front end of the first outer barrel 17. The brush 19 and the code plate 20 constitute a focal detecting device.

Figure 6:
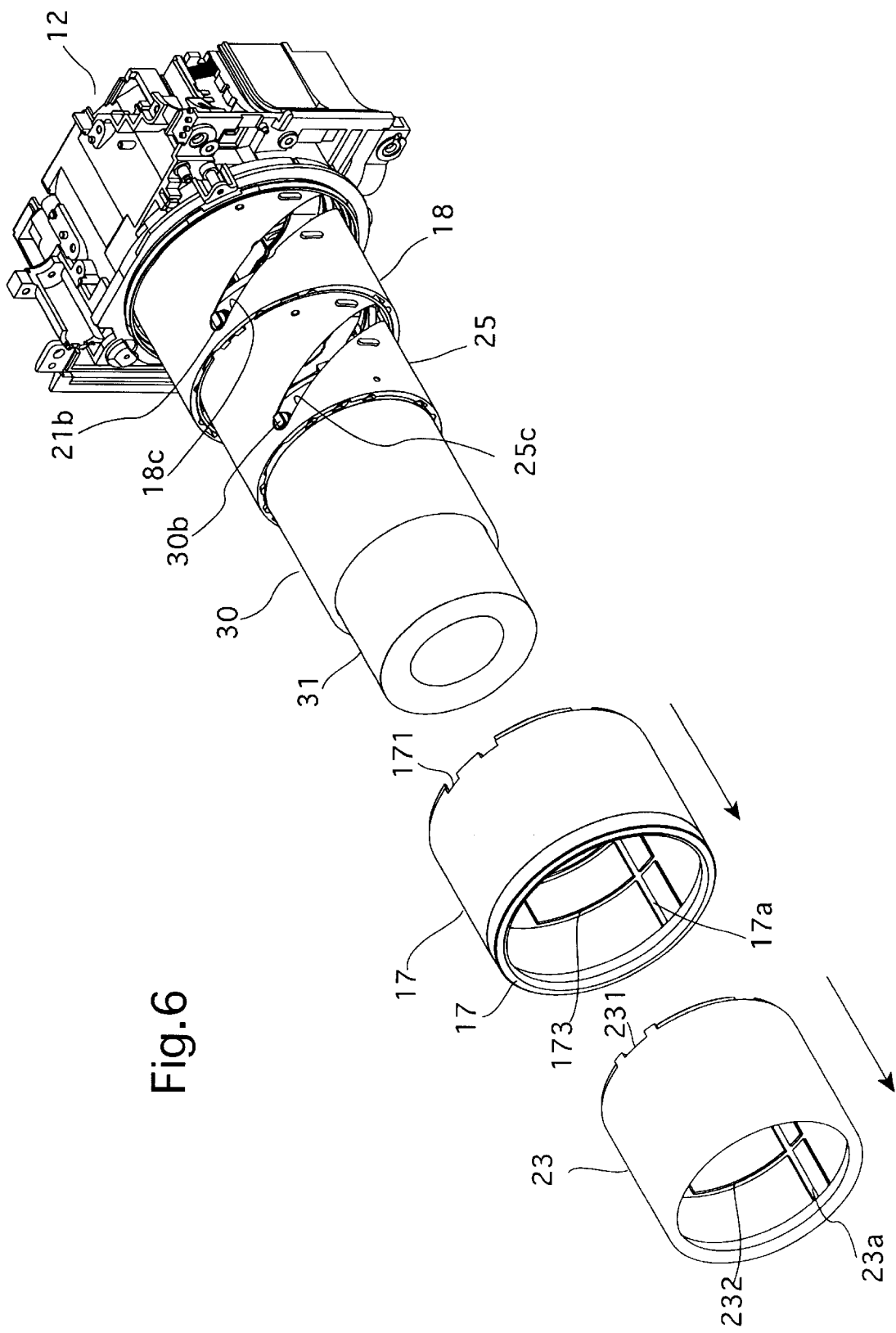
FIG. 6 is a perspective view showing the zoom lens barrel assembly of FIG. 5 with some of the lens barrels removed.
Figure 7:
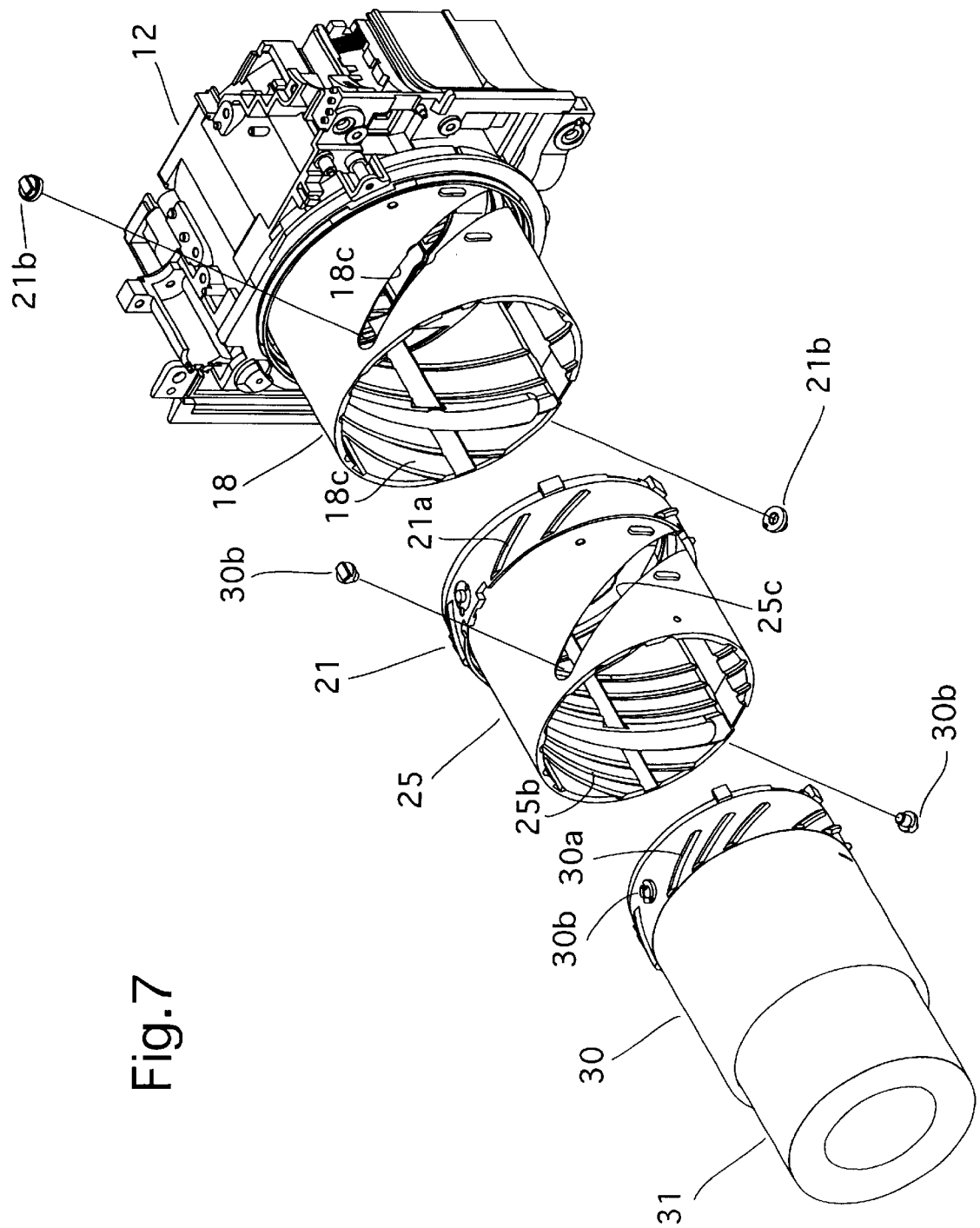
FIG. 7 is a perspective view of the zoom lens barrel assembly of FIG. 6 in a further disassembled state.
Figure 8:
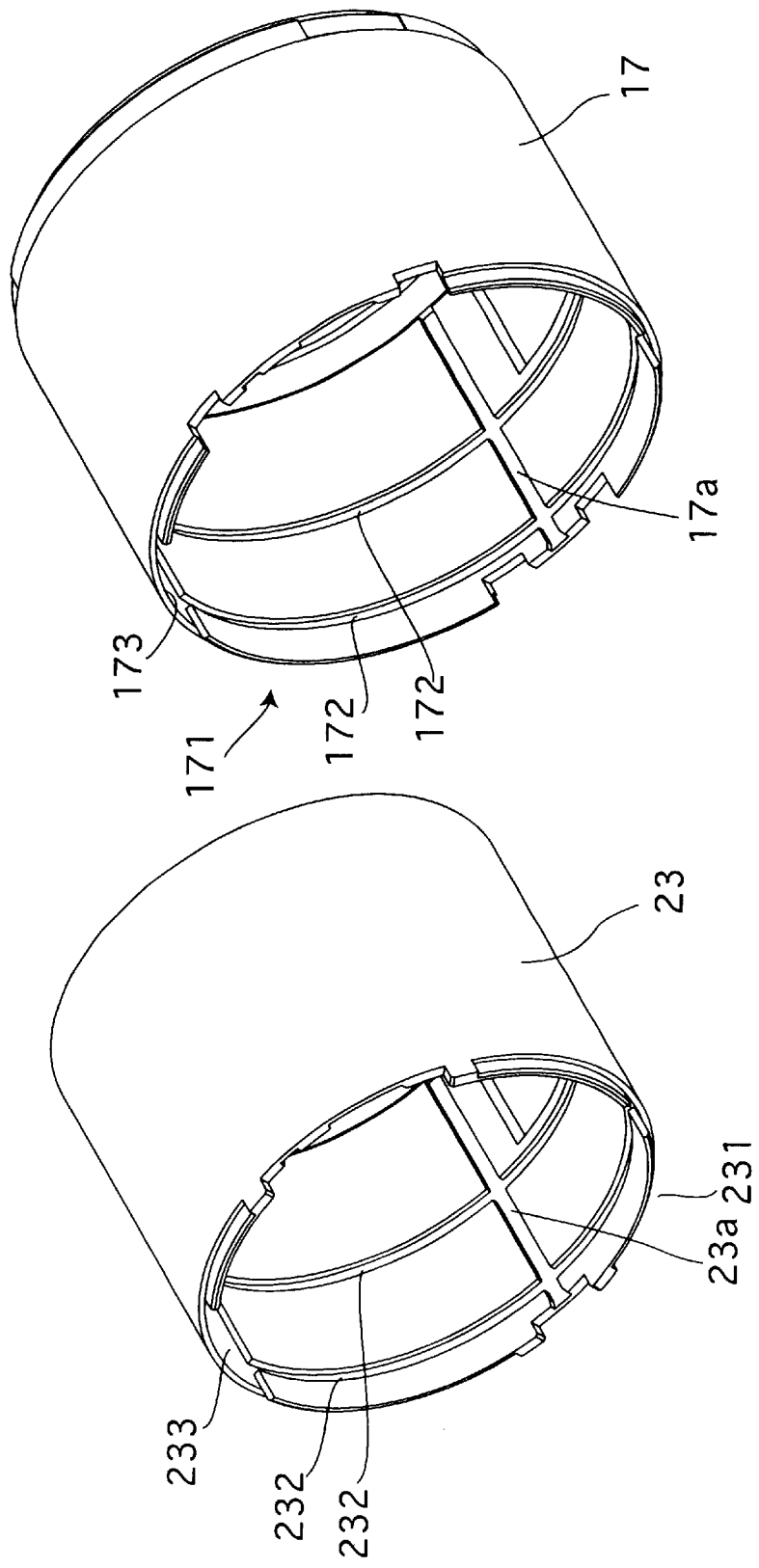
FIG. 8 is a perspective view showing elements of a first outer barrel and a second outer barrel.

Female helicoids 18b are formed on the inner periphery of the first linear guide ring 18, and engage with male helicoids 21a formed on the outer periphery of a second helicoid ring 21. The second helicoid ring 21 includes on the outer periphery thereof a pair of guide heads 21b, which are placed through a pair of guide slots 18c formed in the first linear guide ring 18 and received in a pair of head guide grooves 17a formed on the inner periphery of the first outer barrel 17 (FIGS. 6 and 7). The guide slots 18c are each formed as an elongate through hole that has the same angle of inclination as the female helicoids 18b. As shown in FIG. 8, each head guide groove 17a is a straight groove that extends parallel to the optical axis O of the zoom lens system. While part of each guide head 21b that is placed through the guide slot 18c is formed to have a cylindrical shape with a circular cross-section, an end of the guide head 21b that is received in the head guide groove 17a is formed as a rectangular key that extends along the head guide groove 17a.

The second outer barrel 23 is connected to the second helicoid ring 21 at the front end of the helicoid ring 21. As with the first helicoid ring 14 and the first outer barrel 17, the second helicoid ring 21 and the second outer barrel 23 are connected to each other through the engagement between engagement portions (recesses) 211 formed on the front end of the helicoid ring 21 and engagement portions (projections) 231 formed on the rear end of the second outer barrel 23 such that the second helicoid ring 21 integrally rotates with the second outer barrel 23 and can integrally retreat and advance. As with the engagement portions 141 and 171, the engagement portions 211 and 231 can be brought into disengagable engagement when the second helicoid ring 21 and the second outer barrel 23 are in a predetermined relative rotational position (assembly/disassembly position).

A second linear guide ring 25 is supported within the second outer barrel 23, and can be rotated relative to the second outer barrel 23 and moves along the optical axis together with the second outer barrel 23 (i.e., no relative displacement thereof is permitted along the optical axis). Linear guide projections 25a formed on the second linear guide ring 25 engage with respective linear guide slots 18d formed on the first linear guide ring 18, so that the second linear guide ring 25 can only move along the optical axis relative to the first linear guide ring 18.

A pair of circumferential grooves 232 are formed on the inner periphery of the second outer barrel 23 and are separated from one another by a predetermined distance along the optical axis. A pair of keys 251, formed on the outer periphery of the second linear guide ring 25, engage with the respective circumferential grooves 232. Engagement of the keys 251 with the respective circumferential grooves 232 permits rotation of the second outer barrel 23 relative to the second linear guide ring 25 while preventing the relative movement between them along the optical axis.

Thus, upon activation of the zooming motor 15, a driving force therefrom is transmitted through the series of the reduction gears 15a and the pinion 16, to cause the first helicoid ring 14 and the first outer barrel 17 to advance or retreat while rotating and the first guide ring 18, to advance or retreat along the optical axis without rotating. This in turn causes the connected unit including the second helicoid ring 21, the second outer barrel 23 and the second linear guide ring 25, to advance and retreat along the optical axis. Consequently, the second helicoid ring 21 and the second outer barrel 23 advance or retreat along the optical axis relative to the first outer barrel 17 due to the engagement of the guide heads 21b with the respective guide slots 18c and the head guide grooves 17a, while rotating along with the first outer barrel 17 as the male helicoids 21a mesh with the female helicoids 18b. On the other hand, the second linear guide ring 25 advances or retreats together with the second helicoid ring 21 and the second outer barrel 23 without rotating, due to the engagement of the linear guide projections 25a with the respective linear guide slots 18d.

The engagement portions 211 and the engagement portions 231, and the keys 251 and the circumferential grooves 232, are respectively configured so that when the second helicoid ring 21 and the second outer barrel 23, and the second outer barrel 23 and the second linear guide ring 25, are in their respective predetermined relative rotational positions (assembly/disassembly positions), the second helicoid ring 21 and the second outer barrel 23, and the second outer barrel 23 and the second linear guide ring 25, can be moved along the optical axis toward and away from each other for engagement/disengagement.

As with the first linear guide ring 18, female helicoids 25b are formed on the inner peripheral of the second linear guide ring 25. The female helicoids 25b engage with male helicoids 30a formed on the rear outer periphery of the third outer barrel (cam ring) 30. The third outer barrel 30 also serves as a third helicoid ring and includes a pair of guide heads 30b on the rear outer surface thereof. The pair of the guide heads 30b are placed through a pair of guide slots 25c formed in the second linear guide ring 25 and are received in a pair of head guide grooves 23a formed on the inner periphery of the second outer barrel 23 (see FIGS. 8 and 14). While part of each guide head 30b that is placed through the guide slot 25c is formed to have a cylindrical shape with a circular cross-section, an end of the guide head 30b that is received in the head guide groove 23a is formed as a rectangular shape that extends along the head guide groove 23a.

The guide slots 25c are each formed as an elongate through hole that has the same angle of inclination as the female helicoids 25b. Each head guide groove 23a is a straight groove that extends parallel to the optical axis O.

A third linear guide ring 33 is supported within the third outer barrel 30, which can be rotated relative to the third outer barrel 30 and moves integrally with the third outer barrel 30 along the optical axis (i.e., no relative displacement thereof is permitted along the optical axis). The third linear guide ring 33 includes on the outer periphery thereof a plurality of linear guide projections 33a, each of which engages with a linear guide slot 25d formed on the inner periphery of the second linear guide ring 25, allowing the third linear guide ring 33 to move only along the optical axis.

Thus, upon activation of the zooming motor 15, the first helicoid ring 14 and the first outer barrel 17 advance or retreat along the optical axis while rotating. The first linear guide ring 18 advances or retreats along the optical axis together with the first helicoid ring 14 and the first outer barrel 17 without rotating. The second helicoid ring 21 and the second outer barrel 23 advance or retreat relative to each other along the optical axis while rotating together at the same rotation speed with respect to the first outer barrel 17. The second linear guide ring 25 advances or retreats together with the second helicoid ring 21 and the second outer barrel 23 without rotating. As a result, as the male helicoids 30a mesh with the female helicoids 25b, the third outer barrel 30 and the third linear guide ring 33 advance or retreat along the optical axis with respect to the second outer barrel 23, while rotating together with the second outer barrel 23 at the same rotation speed due to the engagement of the guide heads 30b with the guide slots 25c and the head guide grooves 23a. The third linear guide ring 33, with the restriction of the linear guide projections 33a engaging the linear guide slots 25d, advances or retreats along the optical axis together with the third outer barrel 30 without rotating. A portion of the third outer barrel 30 in front of the helicoids 30a extends from the second outer barrel 23 and is exposed outside to form a part of the external appearance of the lens barrel.

Figure 9:
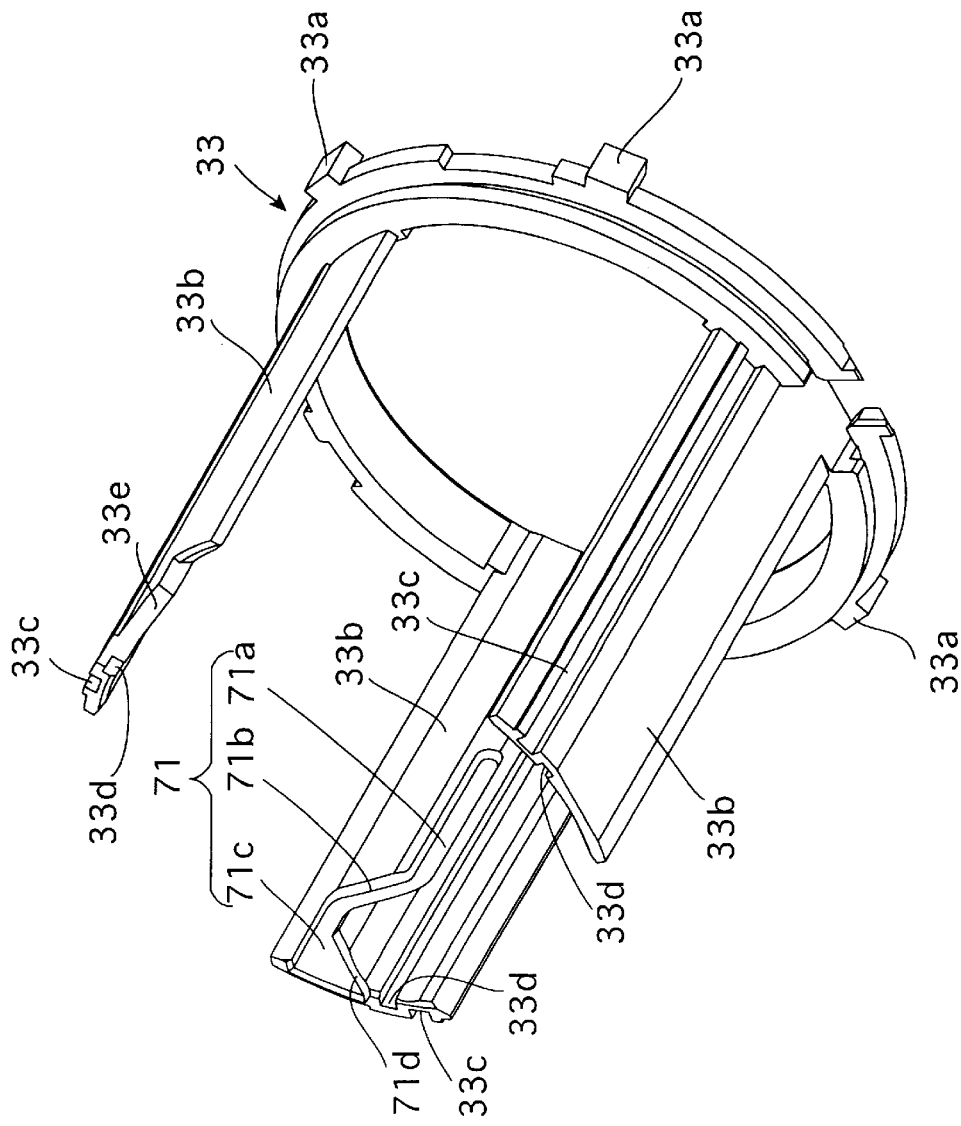
FIG. 9 is a perspective view showing an element of a third linear guide ring.
Figure 10:
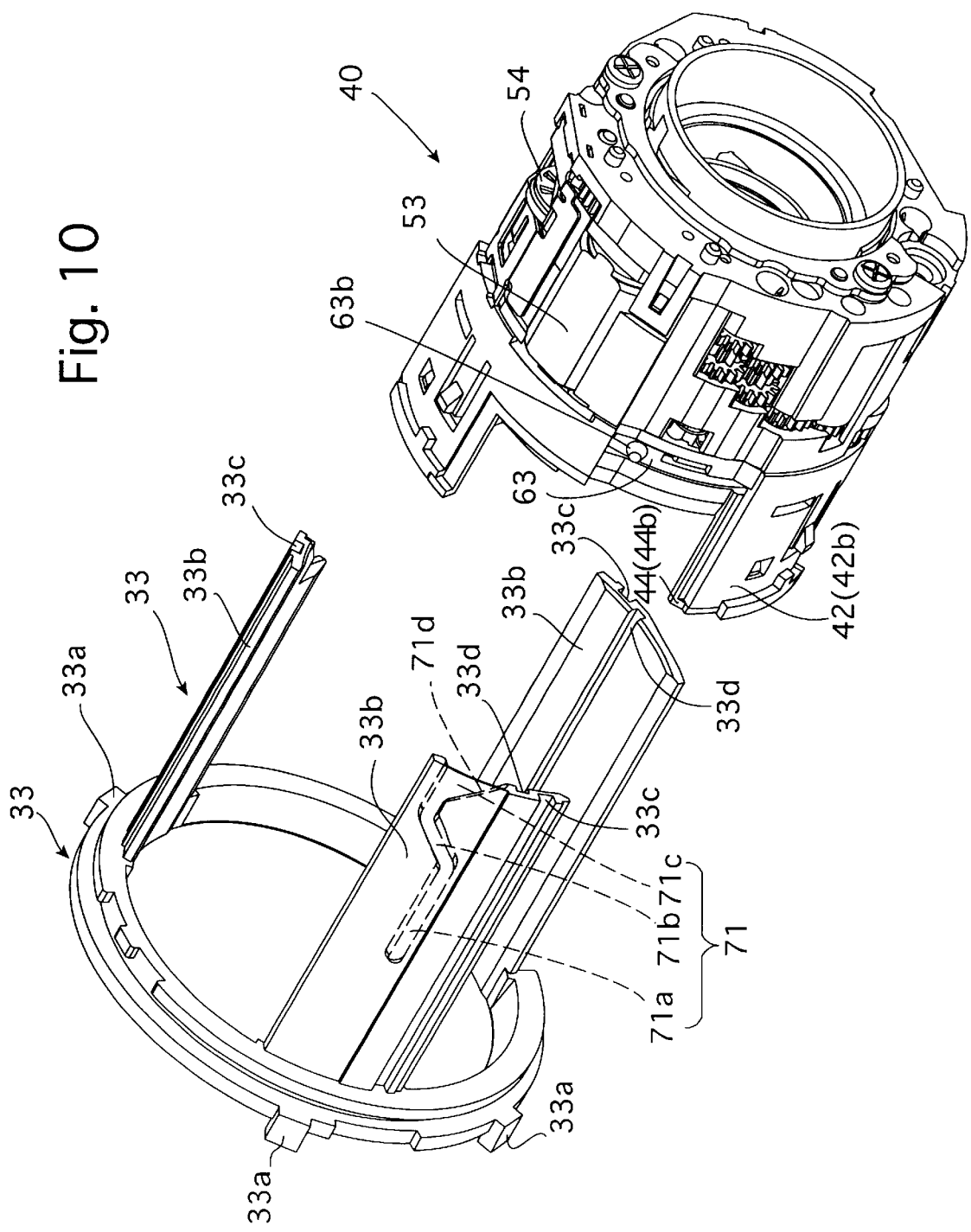
FIG. 10 is an exploded perspective view showing the third linear guide ring along with a shutter unit.

The fourth outer barrel (lens-retaining barrel) 31, which holds a first lens group L1 (which includes a first sub-lens group S1 and a second sub-lens group S2), and a rear lens group frame 32 including a secured second lens group L2, are supported within the third outer barrel 30, with the fourth outer barrel 31 being in front of the rear lens group frame 32. The fourth outer barrel 31 and the rear lens group frame 32 are guided along the optical axis by the third linear guide ring 33. Specifically, the third linear guide ring 33 includes three arm members 33b, each having a partial cylindrical shape as shown in FIGS. 9 and 10. Each arm member 33b includes on respective sides thereof (i.e., the outer periphery and the inner periphery) linear guide slots 33c and 33d, each of which extends parallel to the optical axis O. Each guide slot 33c slidably receives a linear guide projection (not shown) provided on the inner periphery of the fourth outer barrel 31, whereas each guide slot 33d slidably receives a linear guide projection 32a provided on the outer periphery of the rear lens group frame 32.

Figure 12:
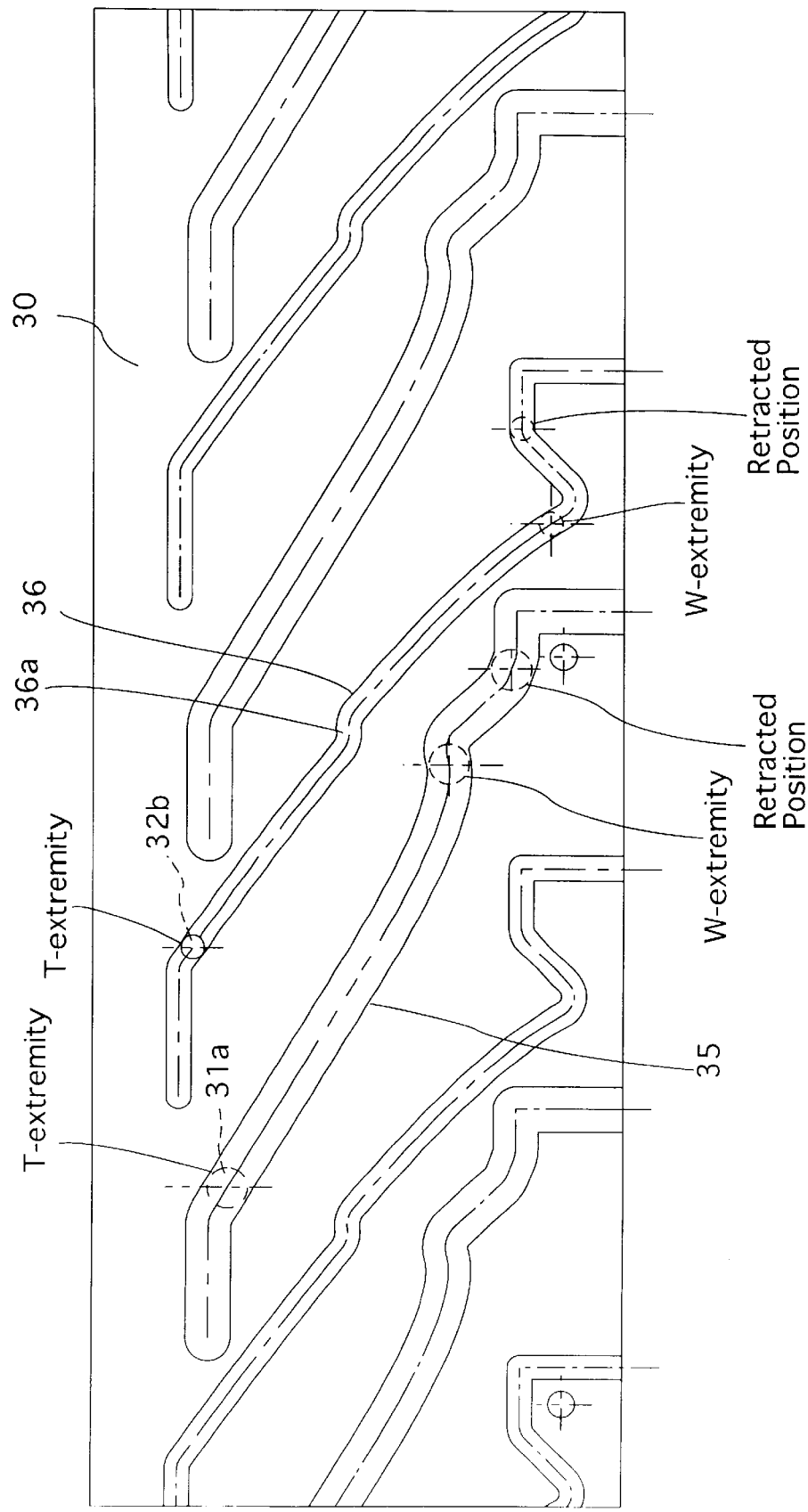
FIG. 12 is an developed view of a cam ring showing profiles of cam grooves on the inner surface of the cam ring.

Front lens group cam grooves 35 for the fourth outer barrel 31 and rear lens group cam grooves 36 for the rear lens group frame 32 are formed on the inner periphery of the third outer barrel 30. The front lens group cam grooves 35 and the rear lens group cam grooves 36 are shown in a developed view in FIG. 12. As shown in FIG. 12, three front lens group cam grooves 35 and three rear lens group cam grooves 36 are alternately arranged in the circumferential direction and are equally spaced from one another. Front lens group follower projections 31a and rear lens group follower projections 32b radially protrude from the fourth outer barrel 31 and the rear lens group frame 32, respectively, for engaging the front lens group cam grooves 35 and the rear lens group cam grooves 36, respectively.

Accordingly, when the zooming motor 15 is activated and the third outer barrel 30 advances or retreats along the optical axis while rotating together with the first outer barrel 17 and the second outer barrel 23, and the third linear guide ring 33 advances or retreats along the optical axis together with the third outer barrel 30 without rotating, the fourth outer barrel 31 and the rear lens group frame 32, while being prevented from rotating by the engagement of the linear guide projections (not shown) with the linear guide slots 33c, advance or retreat along the optical axis on a predetermined path with respect to the third outer barrel 30 due to the engagement of the follower projections 31a and 32b with the respective cam grooves 35 and 36.

The follower projections 31a and 32b and the respective cam grooves 35 and 36, which cause the fourth outer barrel 31 and the rear lens group frame 32 to move toward and away from each other along the optical axis, constitute a zoom cam mechanism.

A portion of the fourth outer barrel 31 in front the follower projections 31a extends from the third outer barrel 30 and is exposed outside to form a part of the external appearance of the lens barrel.

The above-described zoom lens barrel has a construction in which the first linear guide ring 18, the second linear guide ring 25, the third linear guide ring 33, and the fourth outer barrel 31 advance and retreat linearly along the optical axis with respect to the fixed barrel 12, without rotating.

As shown in FIG. 12, the region of each front lens group cam groove 35 and the region of each rear lens group cam groove 36 extending between respective telephoto extremity positions (indicated as T-extremity) and retracted positions (indicated as retracted) are used in normal operations. During photographing, the follower projection 31a and the follower projections 32b are each guided over the normal operation region between the telephoto extremity position (T-extremity) and the wide-angle extremity position (W-extremity). The rear lens group cam groove 36 has an intermediate discontinuous position 36a between the telephoto extremity position (T-extremity) and the wide-angle extremity position. Between the telephoto extremity position and the wide-angle extremity position, the first lens group L1, retained within the fourth outer barrel 31, which is guided over the front lens group groove 35, has a switching function in which the first sub-lens group S1 and the second sub-lens group S2 is switched between a mutually close position (tele mode) and a mutually distant position (wide mode). Upon switching in the first lens group L1, the second lens group L2 passes the intermediate discontinuous position 36a in the rear lens group cam groove 36. The zoom lens system is controlled such that the intermediate discontinuous position 36a is not used as an actual zooming range during a photographing operation (i.e., the third outer barrel 30 does not come to a stop thereat).

The lens group cam grooves 35 and 36 include an assembly/disassembly position beyond the telephoto extremity position, to which the zoom lens barrel needs to be rotated for assembly/disassembly.

A shutter unit (electric member/diaphragm unit) 40 is arranged within the fourth outer barrel 31. A front sub-lens group frame 45 and a rear sub-lens group frame 46 are fitted in the shutter unit 40. The first sub-lens group S1 is secured to the front sub-lens group frame 45, and the second sub-lens group S2 is secured to the rear sub-lens group frame 46. The relative position of the front sub-lens group frame 45 (first sub-lens group S1) with respect to the rear sub-lens group frame 46 (second sub-lens group S2) along the optical axis is switched between two positions, namely, the mutually distant position for wide-angle photographing and a mutually close position for telephoto photographing. The switching is performed between the wide-angle extremity and the telephoto extremity via a focusing cam mechanism, which is driven by a bi-directional motor 53. In each position, the sub-lens groups S1 and S2 are advanced or retreated along the optical axis for focusing by the bi-directional motor 53 through the focusing cam mechanism.

Figure 2:
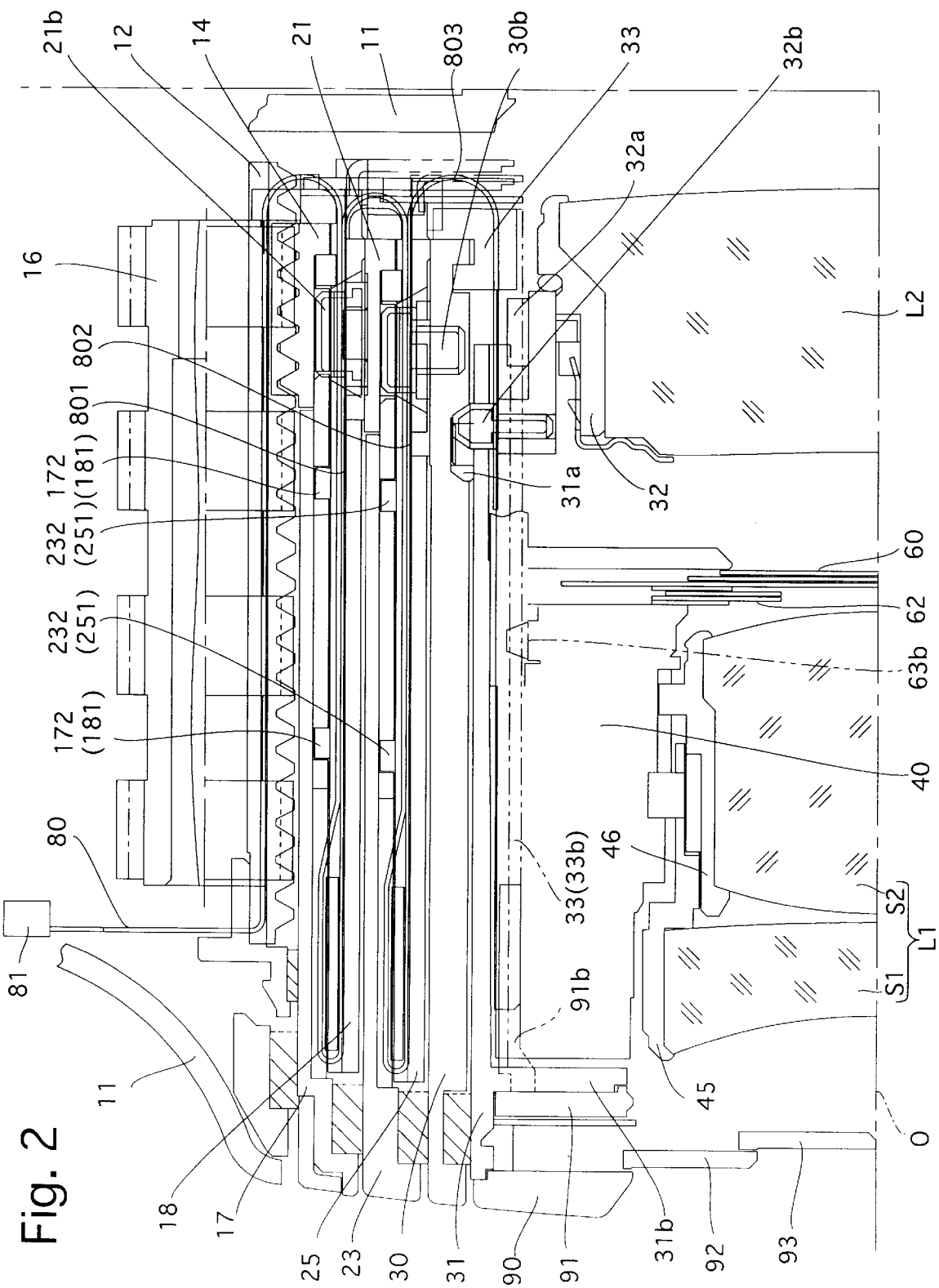
FIG. 2 is a cross-section showing an upper half of the zoom lens barrel assembly in a retracted state.
Figure 3:
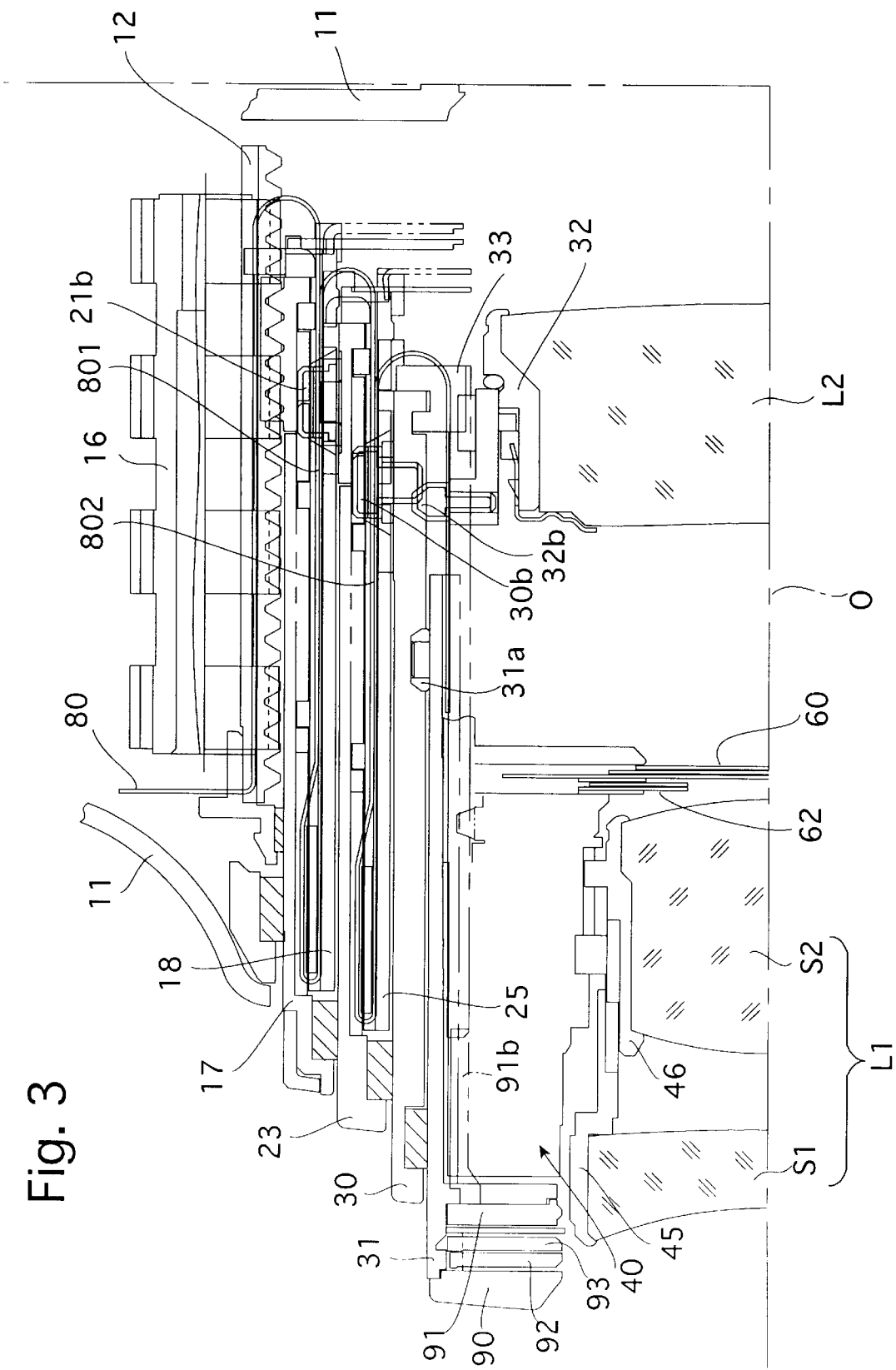
FIG. 3 is a cross-section showing the upper half of the zoom lens barrel assembly in a photographing position at the wide-angle extremity.

The shutter unit 40 is also provided behind the second sub-lens group S2 with a lens shutter device which includes shutter sectors 60, and a diaphragm mechanism which includes diaphragm sectors 62 (see FIGS. 2 and 3). In the zoom lens barrel of the present embodiment, the shutter sectors 60 are blades that serve both as a variable aperture to determine an f-number, and as a shutter. The shutter sectors 60 are electrically controlled by a control circuit 81 so that when the shutter is released, the degree of opening of the shutter sectors 60 (f-number) and time that the shutter sectors 60 remain open (shutter speed) vary depending on the exposure. On the other hand, the diaphragm sectors 62 are provided for the purpose of limiting the maximum aperture size especially during wide-angle photographing. The degree of opening of the diaphragm sectors 62 is mechanically varied depending on how far the entire zoom lens barrel needs to extend outward. In other words, the diaphragm sectors 62 limit the aperture size so that unwanted light is not collected during wide-angle photographing.

A diaphragm drive ring 63 for opening and closing the diaphragm sectors 62 includes on the periphery thereof a lug 63b, which engages with a diaphragm-controlling cam slot 71 formed on the inner periphery of the partial cylindrical arm member 33b of the third linear guide ring 33 (see FIG. 10). Upon zooming, the third linear guide ring 33 and the shutter unit 40 (diaphragm drive ring 63) move relative to each other along the optical axis. This causes the lug 63b to follow the diaphragm-controlling cam slot 71 and move in the circumferential direction. This in turn causes the diaphragm drive ring 63 to rotate and, as a result, the size of the aperture formed by the diaphragm sectors 62 is varied.

Figure 11:
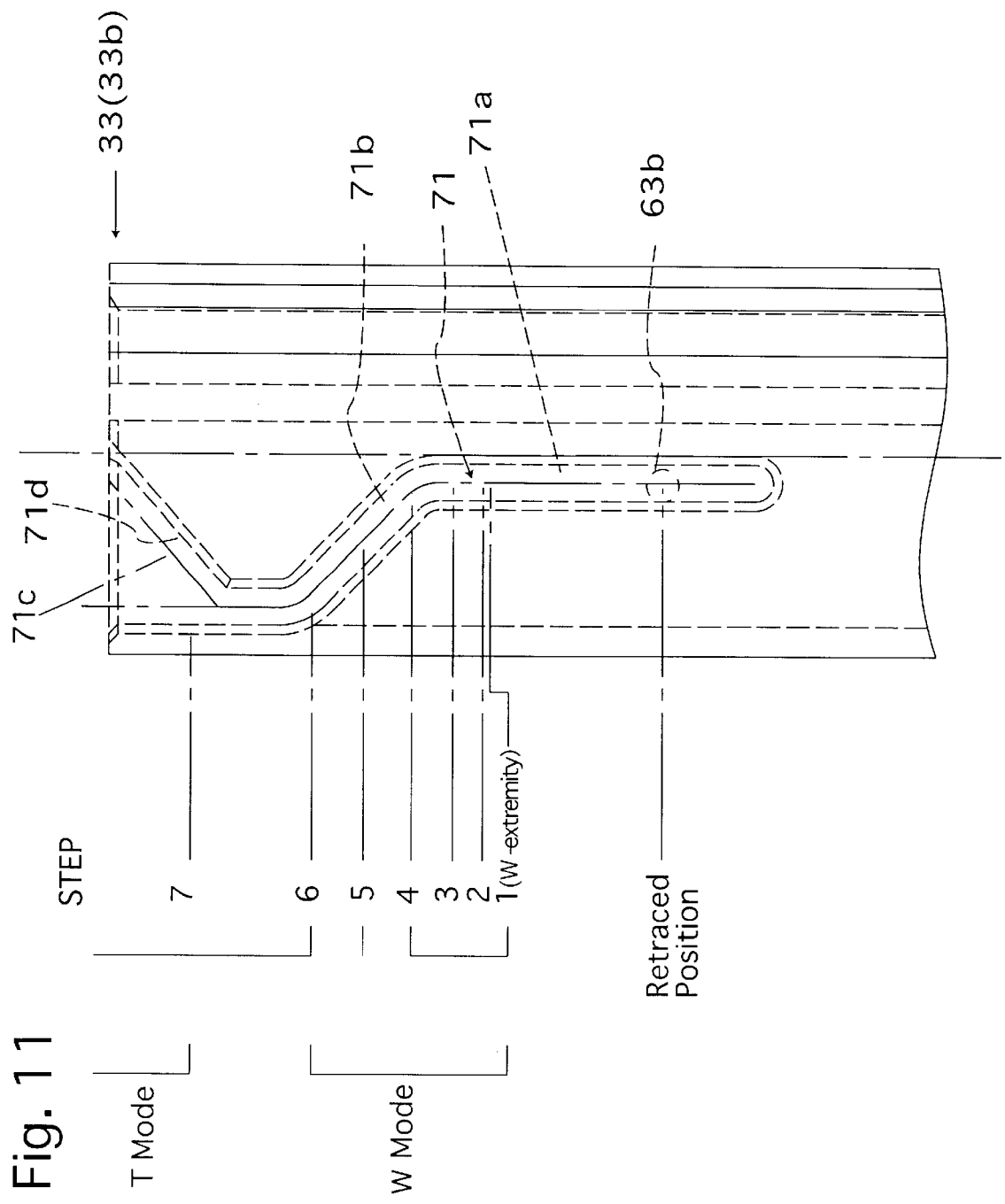
FIG. 11 is a developed view of the third linear guide ring showing a cam groove for adjusting a diaphragm.

As shown in FIG. 11, the diaphragm-controlling cam slot 71 includes a straight portion 71a extending parallel to the optical axis O, a sloped portion 71b sloped with respect to the optical axis O, and an opening portion 71c opening to the front of the third linear guide ring 33. The straight portion 71a and the sloped portion 71b each have substantially the same width as the lug 63b so that the lug 63b engages therewith with substantially no play.

Electric components of the shutter unit 40 are connected to the control circuit 81 (see FIG. 13) in the camera body via a flexible printed circuit board (FPC) 80. The positions of folds in the FPC 80 move depending on the change in the relative position of the shutter unit 40 with respect to the control circuit 81 as the zoom lens barrel advances and retreats. The FPC 80 is folded into a z-shape to avoid interference with the other components of the barrel and is inserted between the outer barrels.

In the present embodiment, the FPC 80 is folded on top of itself and forms overlapped portions 801 and 802 (see FIGS. 2 and 3). The overlapped portions 801 and 802 are inserted from the rear side of the zoom lens barrel assembly into a gap formed between the first outer barrel 17 and the first linear guide ring 18 and a gap formed between the second outer barrel 23 and the second linear guide ring 25, respectively. The portion of the FPC 80 that comes out from between the second outer barrel 23 and the second linear guide ring 25 extends across the third outer barrel 30 into the fourth outer barrel 31 and is connected to the shutter unit 40 at one end thereof.

Figure 4:
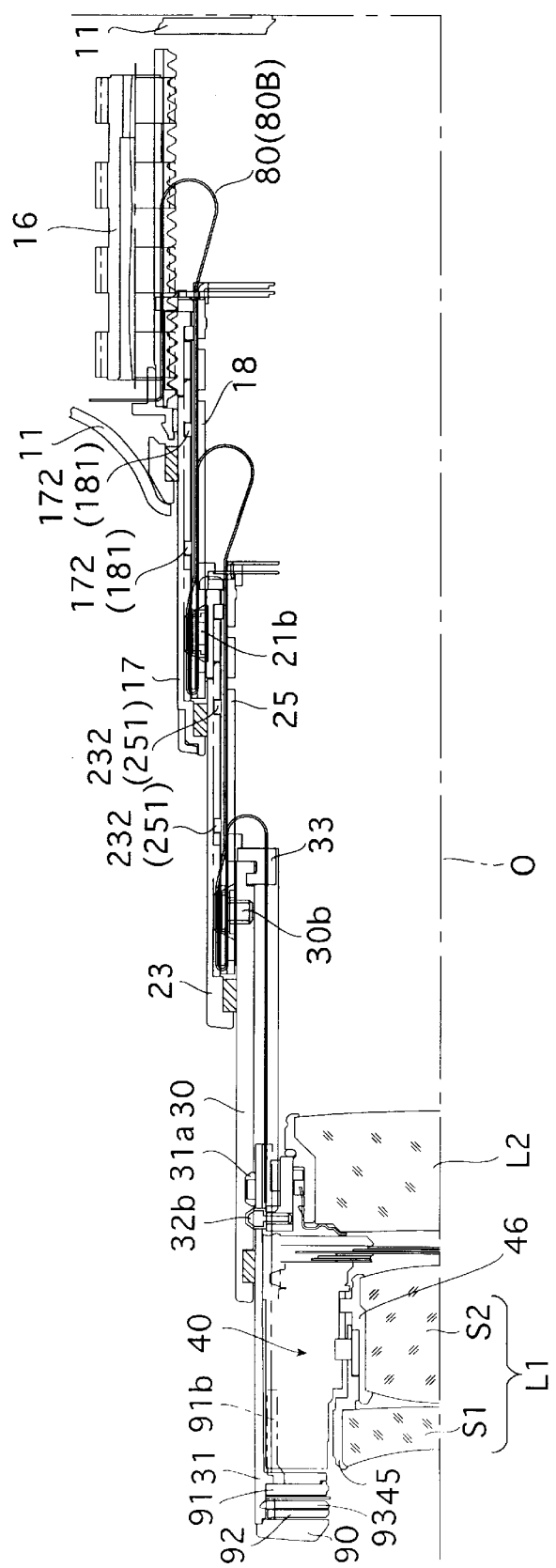
FIG. 4 is a cross-section showing the upper half of the zoom lens barrel assembly in a photographing position at the telephoto extremity.
Figure 36:
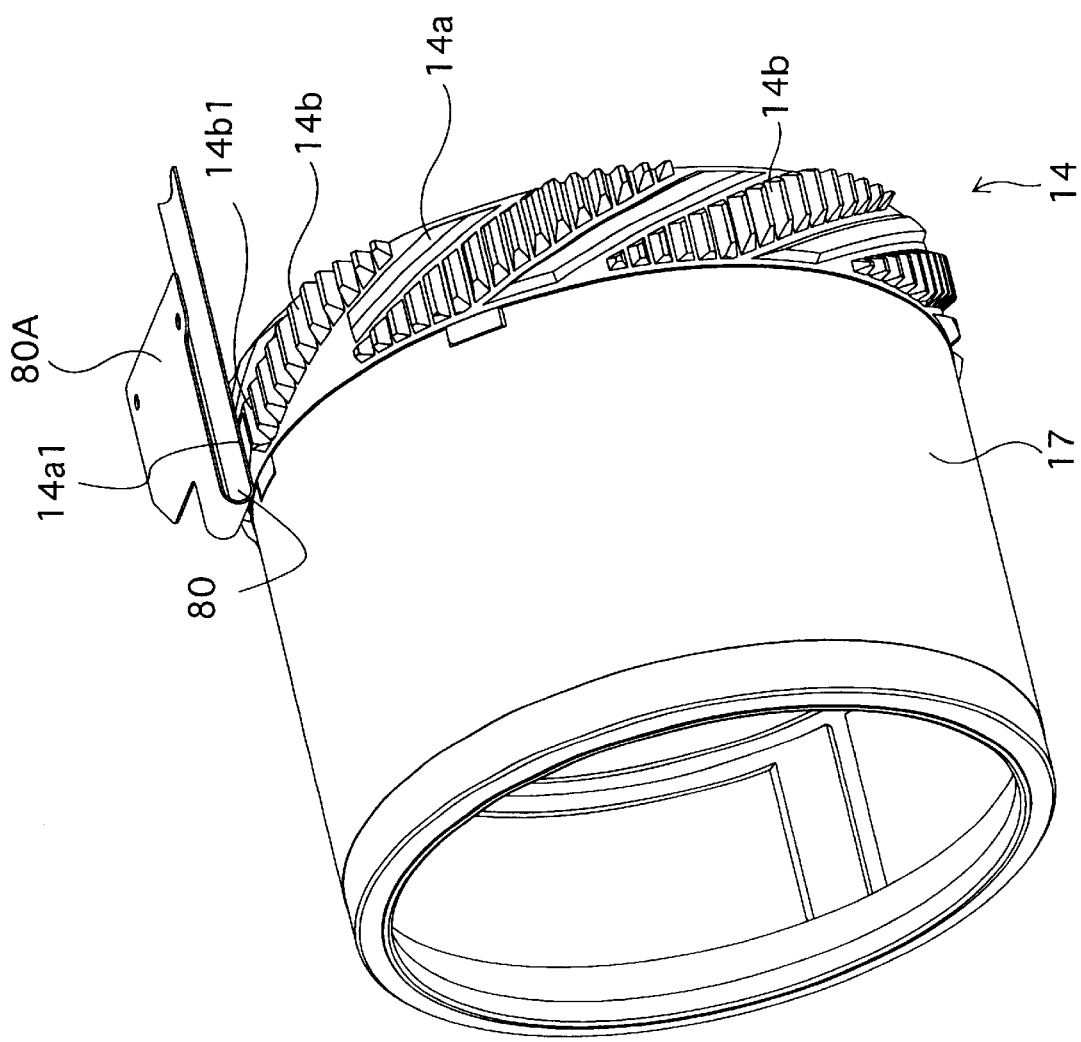
FIG. 36 is a perspective view of the first helicoid ring and the first outer barrel, showing a construction to prevent a flexible printed circuit board of the zoom lens barrel assembly from interfering with the gear teeth of the first helicoid ring.
Figure 37:
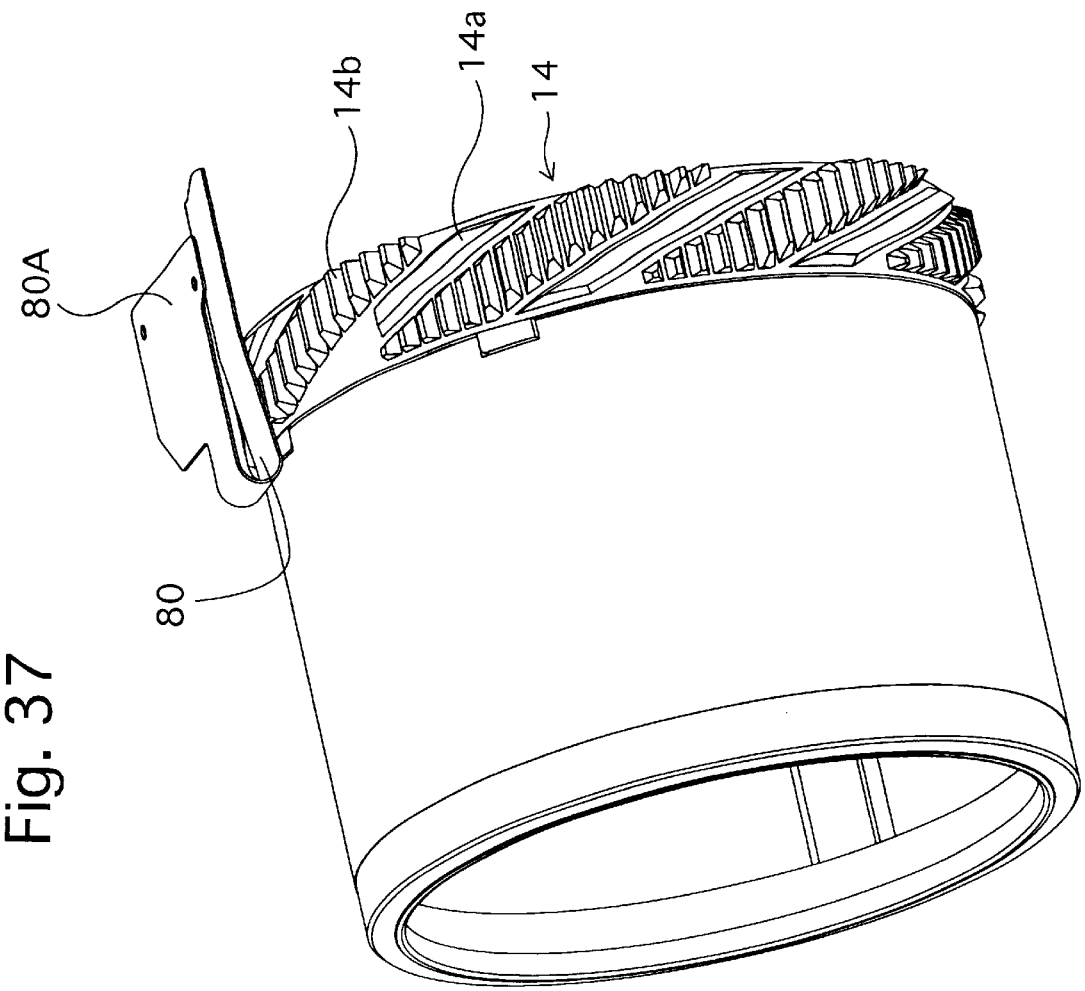
FIG. 37 is a perspective view showing the manner in which the flexible printed circuit board interferes with the gear teeth of the first helicoid ring.
Figure 38:
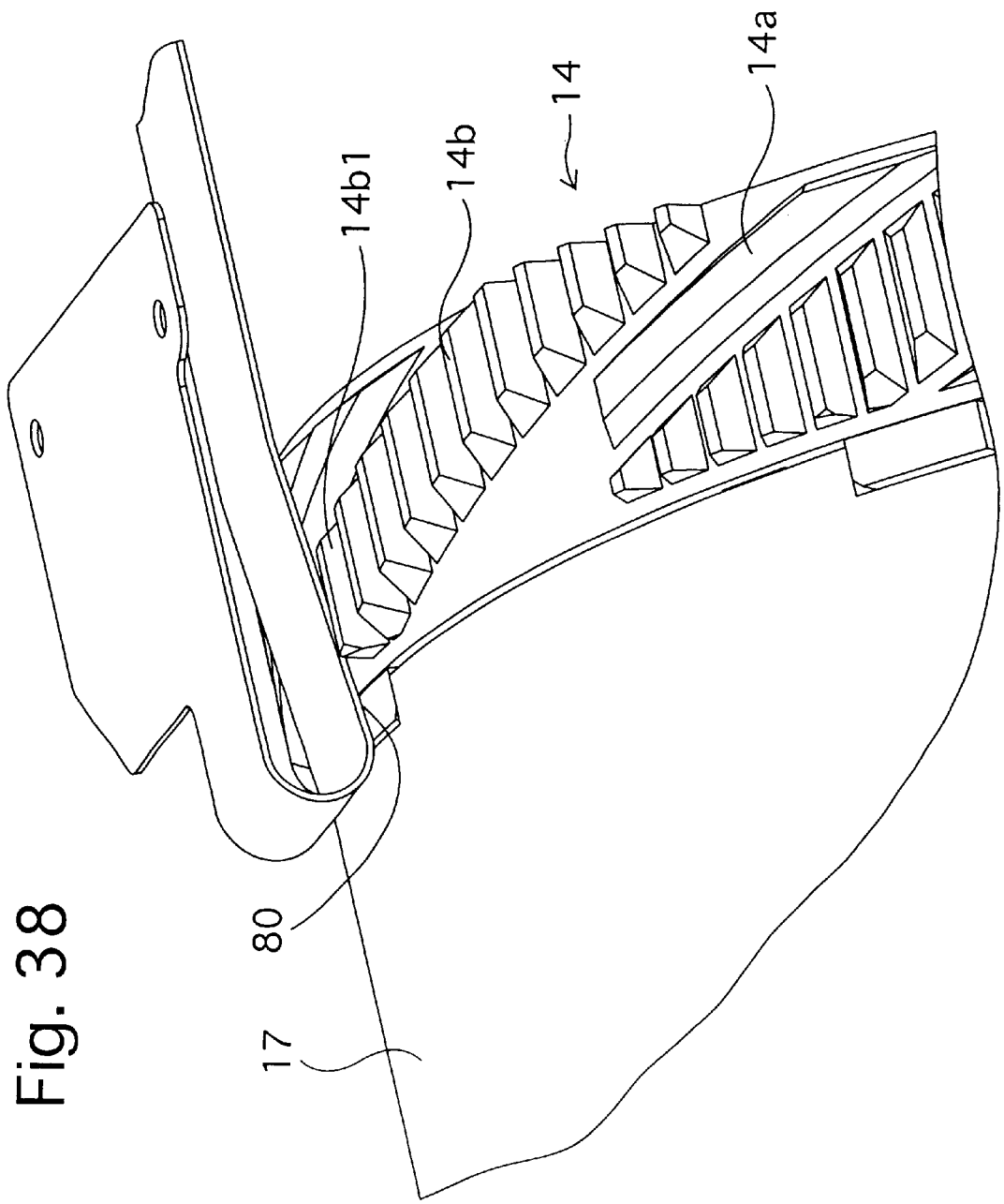
FIG. 38 is a partial enlarged perspective view showing the manner in which the flexible printed circuit board interferes with the gear teeth of the first helicoid ring.

The other end of the FPC 80 is pulled out from the front end of the fixed barrel 12 (FIGS. 2, 3 and 4). The miniaturized construction of the camera poses a limitation to the choice of the position at which the FPC 80 is pulled out. For this reason, the FPC 80 is positioned in the proximity of the helicoids 14a and the gear teeth 14b of the first helicoid ring 14 across the path of the helicoids 14a and the gear teeth 14b. This can result in the FPC 80 intersecting the path of ends of the gear teeth 14b (see FIGS. 36, 37 and 38). If the FPC 80 bends in such a construction, the FPC 80 may catch on an end tooth 14b1 of the gear teeth 14b as shown in FIGS. 37 and 38. However, the present embodiment employs a lead 14a1 formed on the first helicoid ring 14 along the path of the gear teeth 14b for avoiding such interference (see FIG. 34).

Figure 33:
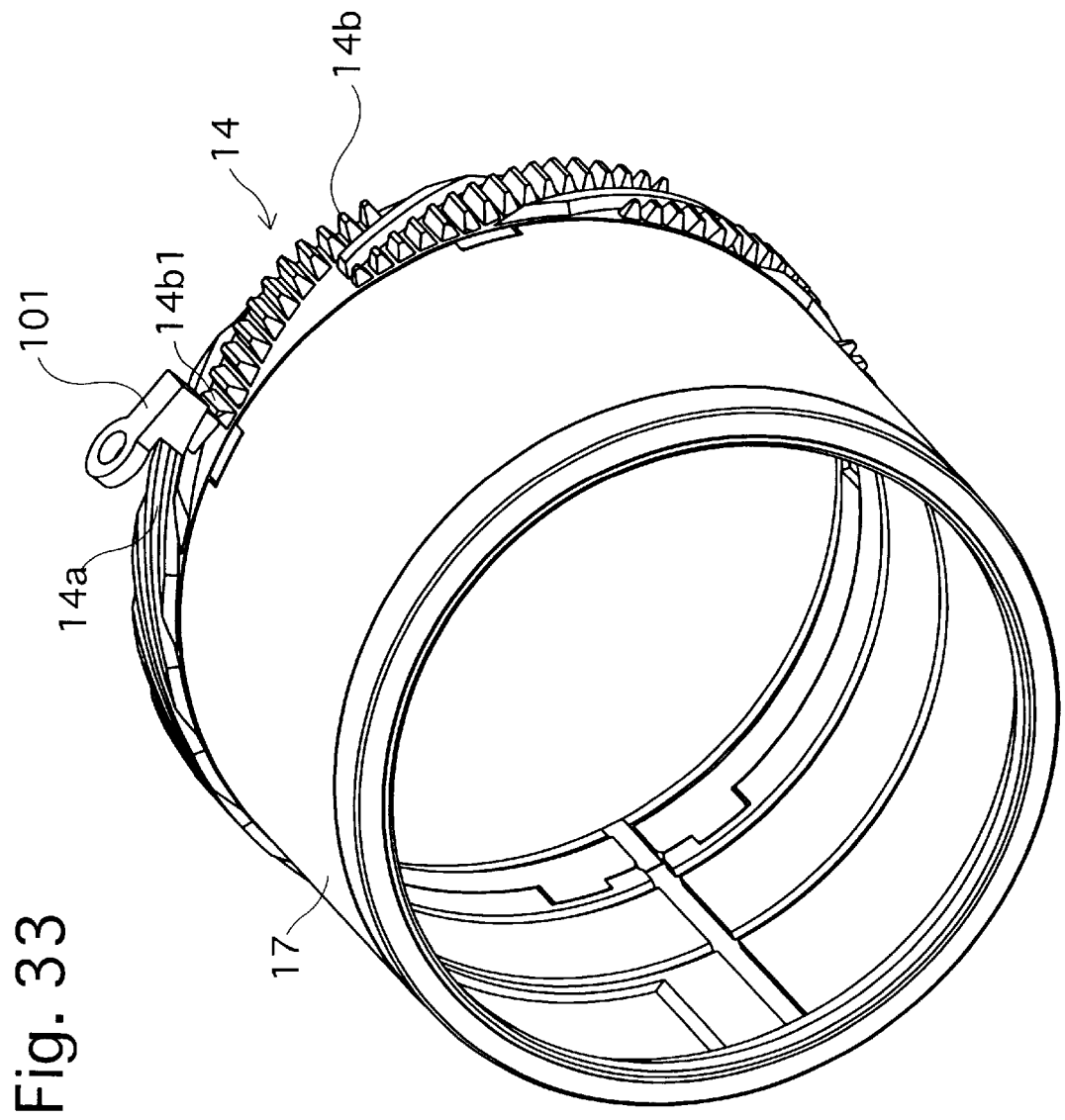
FIG. 33 is a perspective view of the first helicoid ring and the first outer barrel, showing a telephoto-extremity stopper of the zoom lens barrel assembly.

Furthermore, the front end tooth 14b1 of the gear teeth 14b serves as a stopper that comes into contact with a telephoto extremity stopper 101 to prevent further rotation of the first helicoid ring 14 (see FIG. 33). In the present embodiment, a stopper space 14c is provided where the gear teeth 14b terminate in order to permit engagement of the telephoto extremity stopper 101 (see FIG. 34).

Figure 13:
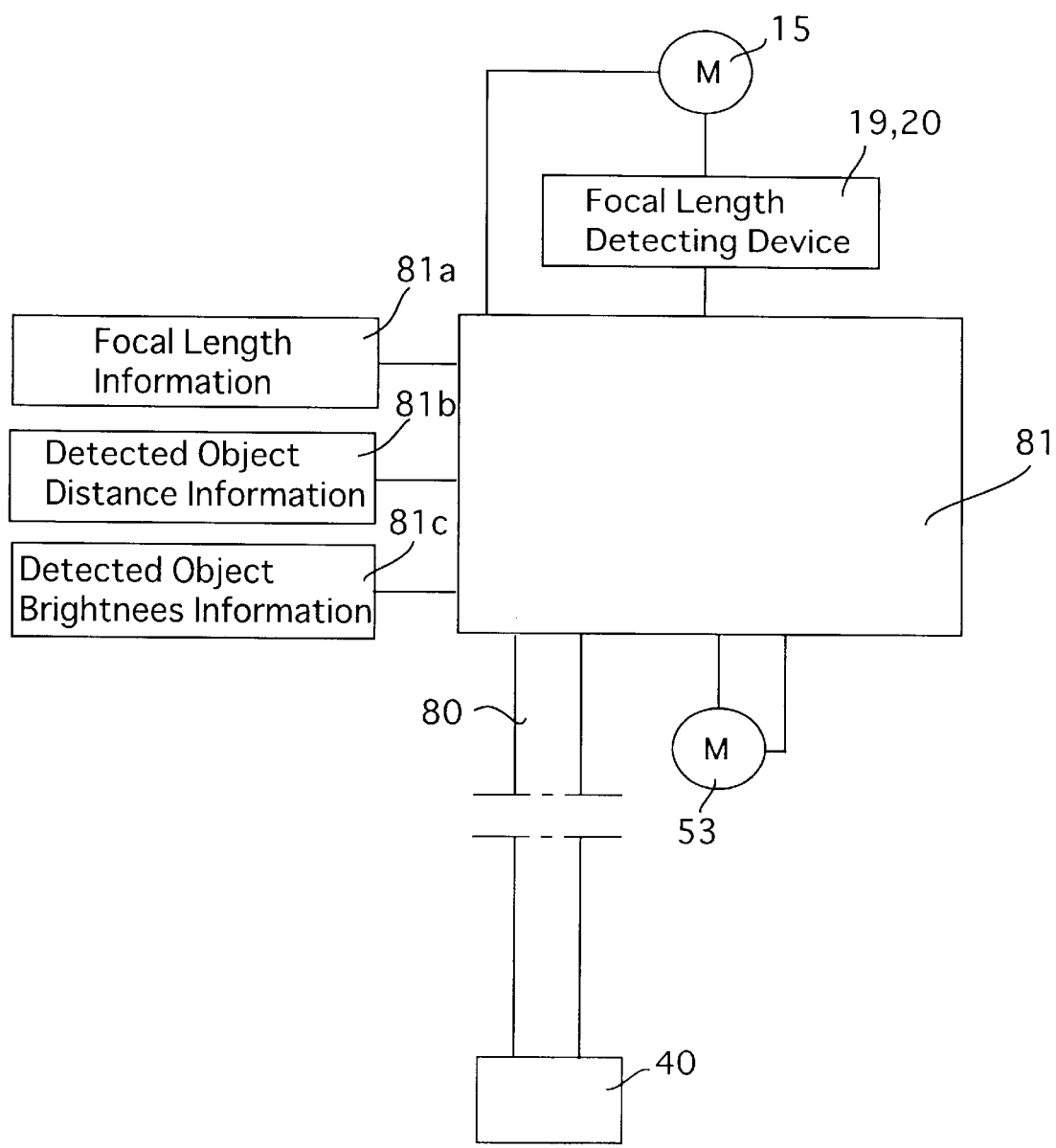
FIG. 13 is a block diagram showing a control system of the zoom lens barrel assembly, the overall structure of which is shown in FIGS. 2 through 4.

As shown in FIG. 13, the zooming motor 15 for the first helicoid ring 14, the bi-directional motor 53 for the front sub-lens group frame 45 and rear sub-lens group frame 46, and the shutter unit 40 are controlled by a control circuit (control device) 81. Focal length information 81a, which is set by the user (photographer) via a zoom switch or the like, detected object distance information 81b, which is provided by a object distance measuring device, and object brightness information 81c, which is provided by a object brightness measuring device are input to the control circuit 81.

The above-described zoom lens barrel assembly of the present invention operates in the following manner. Upon the zooming motor 15 driving the pinion 16, the first helicoid ring 14 and the first outer barrel 17 advance or retreat while rotating. The first linear guide ring 18 advances or retreats together with the first helicoid ring 14 and the first outer barrel 17 along the optical axis without rotating.

The second helicoid ring 21 and the second outer barrel 23, while rotating together at the same rotation speed with respect to the first outer barrel 17, advance or retreat relative to one another along the optical axis. The second linear guide ring 25 advances or retreats along the optical axis together with the second helicoid ring 21 and the second outer barrel 23 without rotating.

The third outer barrel 30 advances or retreats along the optical axis with respect to the second outer barrel 23, while rotating at the same rotation speed. The third linear guide ring 33 advances or retreats along the optical axis together with the third outer barrel 30 without rotating.

The fourth outer barrel 31 advances or retreats along the optical axis without rotating (The third outer barrel 30 rotates with respect to the fourth outer barrel 31).

As a result, the fourth outer barrel 31 (first lens group L1) and the rear lens group frame 32 (second lens group L2), each guided along the optical axis in the third outer barrel 30, move relative to each other along the optical axis on a predetermined path provided by the front lens group cam grooves 35 and the rear lens group cam grooves 36.

For example, in the retracted state of the zoom lens barrel assembly as shown in FIG. 2, the zoom lens barrels are substantially retracted into the camera body 11. When the zooming motor 15 is driven in the direction to extend the barrels, the zoom lens barrel assembly extends outward to assume the photographing position at the wide-angle extremity as shown in FIG. 3. By further driving the zooming motor 15 in the direction to extend the barrels, the zoom lens barrel assembly extends outward from the wide-angle photographing position to the photographing position at the telephoto extremity as shown in FIG. 4.

In the present embodiment, the telephoto extremity stopper 101 serves to stop rotation of the first helicoid ring 14 in order to prevent the zoom lens barrel assembly from further extending out from the telephoto photographing position during normal operation. As shown in FIG. 33, the telephoto extremity stopper 101 engages with the end tooth 14b1 of the first helicoid ring 14, thereby preventing further rotation of the first helicoid ring 14. However, the telephoto extremity stopper 101 does not necessarily have to engage with the end tooth 14b1, in an alternative construction, the telephoto extremity stopper 101 can engage with some of the gear teeth 14b, or with a tooth/teeth at a mid-way position, in the circumferential direction of the first helicoid ring 14. Furthermore, the telephoto extremity stopper 101 does not necessarily have to be attached to the fixed barrel 12 via a screw, but only requires an attaching/detaching device via which the telephoto extremity stopper 101 can be attached/detached by removing a number components without damaging any of the components.

Figure 34:
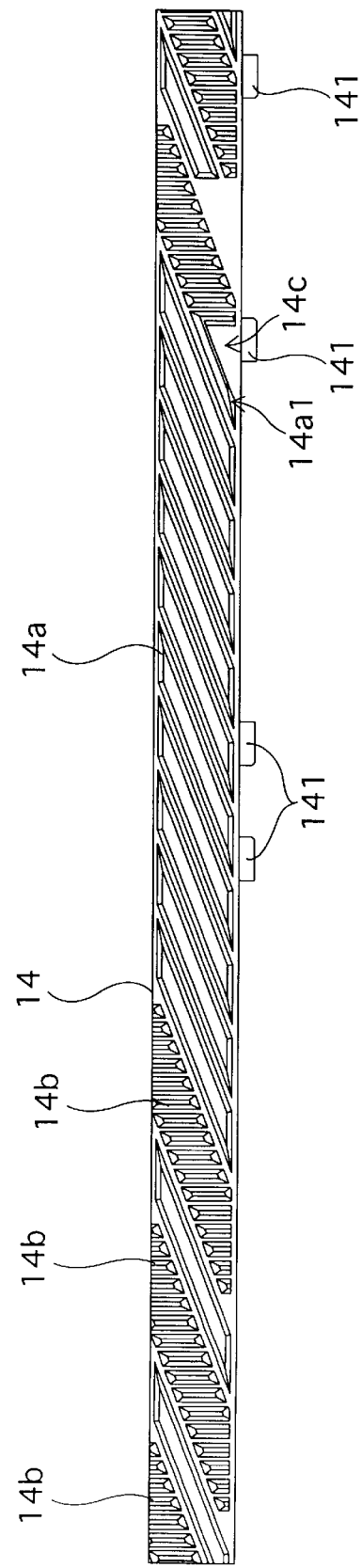
FIG. 34 is a developed view showing the first helicoid ring of the zoom lens barrel assembly.
Figure 35:
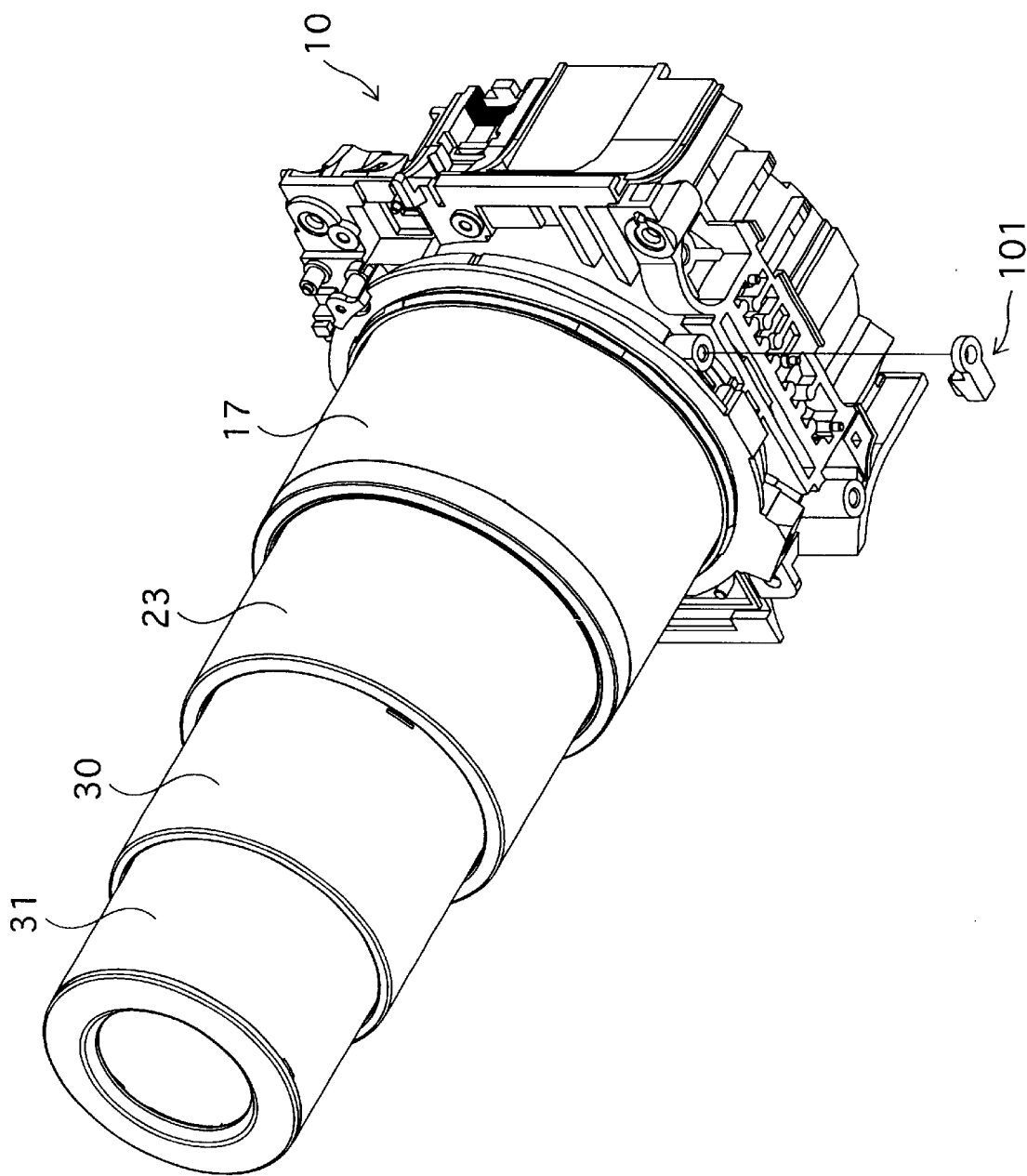
FIG. 35 is a perspective view showing the bottom of the zoom lens barrel assembly in the telephoto extremity position.

The first helicoid ring 14 is shown in a developed view in FIG. 34. The bottom side of FIG. 34 corresponds to the front side of the zoom lens barrel assembly. The first helicoid ring 14 rotates while being led by the male helicoids 14a to advance or retreat. The telephoto extremity stopper 101 is positioned in the path of the gear teeth 14b since the gear teeth 14b are formed along the male helicoids 14a. The telephoto extremity stopper 101 is attached to the fixed barrel 12 and is externally secured to the fixed barrel 12 by a screw (see FIG. 35). By employing such a telephoto extremity stopper 101, which can be externally removed from the fixed barrel 12, the assembly/disassembly of the zoom lens barrel assembly can be facilitated.

Note that the outer diameter of the outermost ends of the gear teeth 14b is larger than the outer diameter of the first outer barrel 17.

Figure 5:
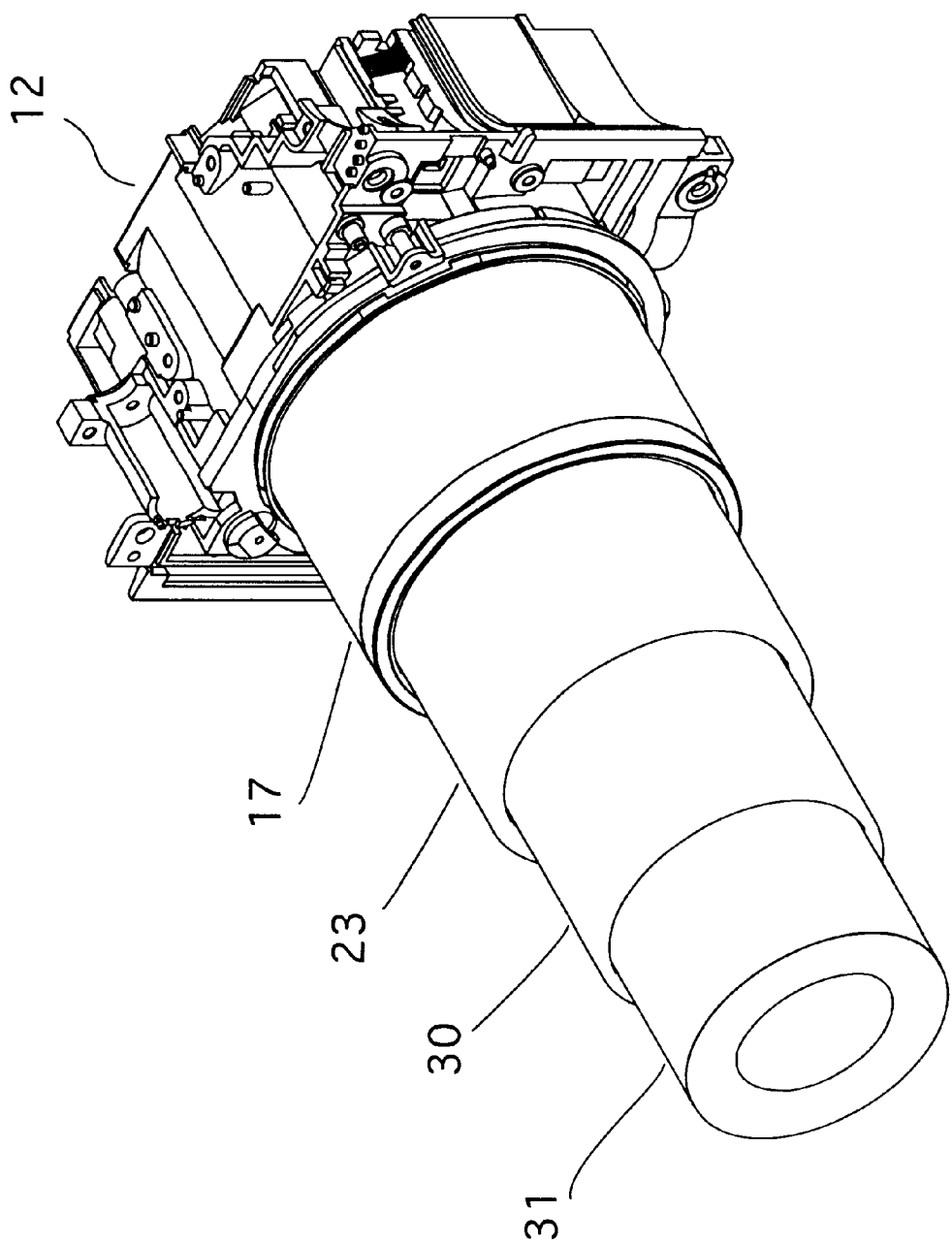
FIG. 5 is a perspective view showing the zoom lens barrel assembly in a fully extended position.

By further driving the zooming motor 15 in the direction to extend the barrels with the telephoto extremity stopper 101 removed, the first helicoid ring 14, the first outer barrel 17 and the second outer barrel 23 are made to further rotate. This causes the zoom lens barrel assembly to extend out from the telephoto photographing position to the assembly/disassembly position of the first outer barrel 17 and the second outer barrel 23 as shown in FIG. 5. In this embodiment, the zoom lens barrel assembly is brought into the assembly/disassembly position by rotating the first helicoid ring 14 by additional 8° from the telephoto photographing position. FIG. 6 shows the zoom lens barrel assembly in the assembly/disassembly position with the first and the second outer barrels 17 and 23 removed.

By driving the zooming motor 15 in the reverse direction to retreat the barrels, the zoom lens barrel assembly is made to retreat from the assembly/disassembly position, to the telephoto photographing position, then to the wide-angle photographing position, and then to the retracted position. In practice, zooming is controlled in a stepwise manner: several focal length steps are provided between the wide-angle extremity and the telephoto extremity, and the zooming motor 15 is stopped at each focal length step to perform focusing and exposure. As described above, the region assigned to the switching of the movement of the first sub-lens group S1 and the second sub-lens group S2 toward and away from each other is not used for photographing. For this reason, no step is provided in this region so that the third outer barrel 30 (thus, the zooming motor 15) does not come to a stop in this region.

Figure 14:
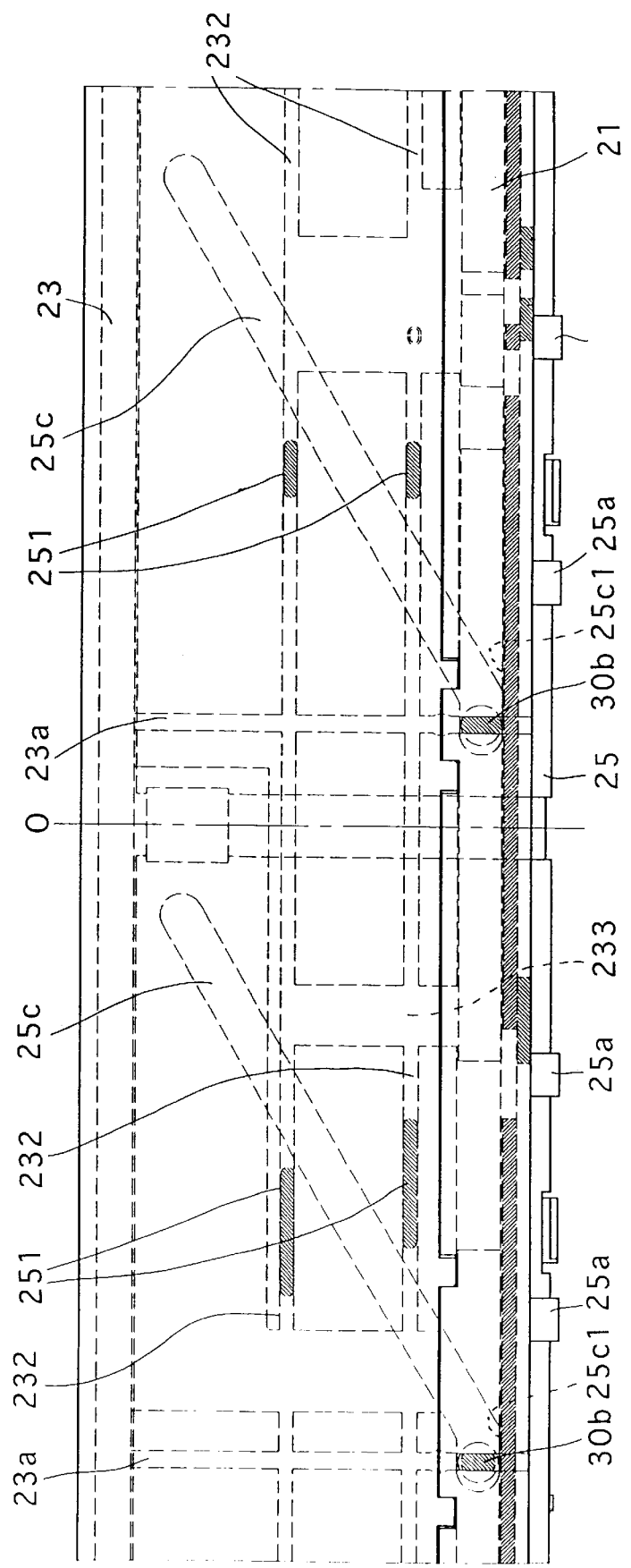
FIG. 14 is an explanatory developed view showing engagement of the second outer barrel, the second helicoid ring, the second linear guide ring and guide heads, in a retracted position of the zoom lens barrel assembly.

In FIG. 14, the second outer barrel 23, the second helicoid ring 21, the second linear guide ring 25 and the guide heads 30b in the retracted position are shown in a developed view as viewed from outside. In the retracted position, keys 251, which extend in the circumferential direction on the outer periphery of the second linear guide ring 25, engage with respective inner peripheral grooves 232, which extend circumferentially on the inner periphery of the second outer barrel 23, so that the second outer barrel 23 and the second helicoid ring 21 can rotate relative to one another and move together along the optical axis. A total of four keys 251 are provided on the outer circumference of the linear guide ring 25. Two keys 251 are provided at the same circumferential position spaced apart by a predetermined length along the optical axis, and the other two keys 251 are provided at a diametrically opposite circumferential position to the other keys 251 and are spaced apart by the same predetermined length along the optical axis as that of the other two keys 251. The guide heads 30b are each placed in a slip region 25c1 of the guide slot 25c.

The slip region 25c1 of the guide slot 25c serves as a slip section for allowing the third outer barrel 30 to rotatably slip. In other words, when the guide head 30b is in the slip region 25c1 and moves along the slip region 25c1, rotation of the third outer barrel 30 with respect to the second linear guide ring 25 does not cause relative movement between the third outer barrel 30 and the second linear guide ring 25 along the optical axis. The slip region 25c1 is provided in the section between the retracted position and the wide angle extremity position of the zoom lens barrel assembly.

Figure 15:
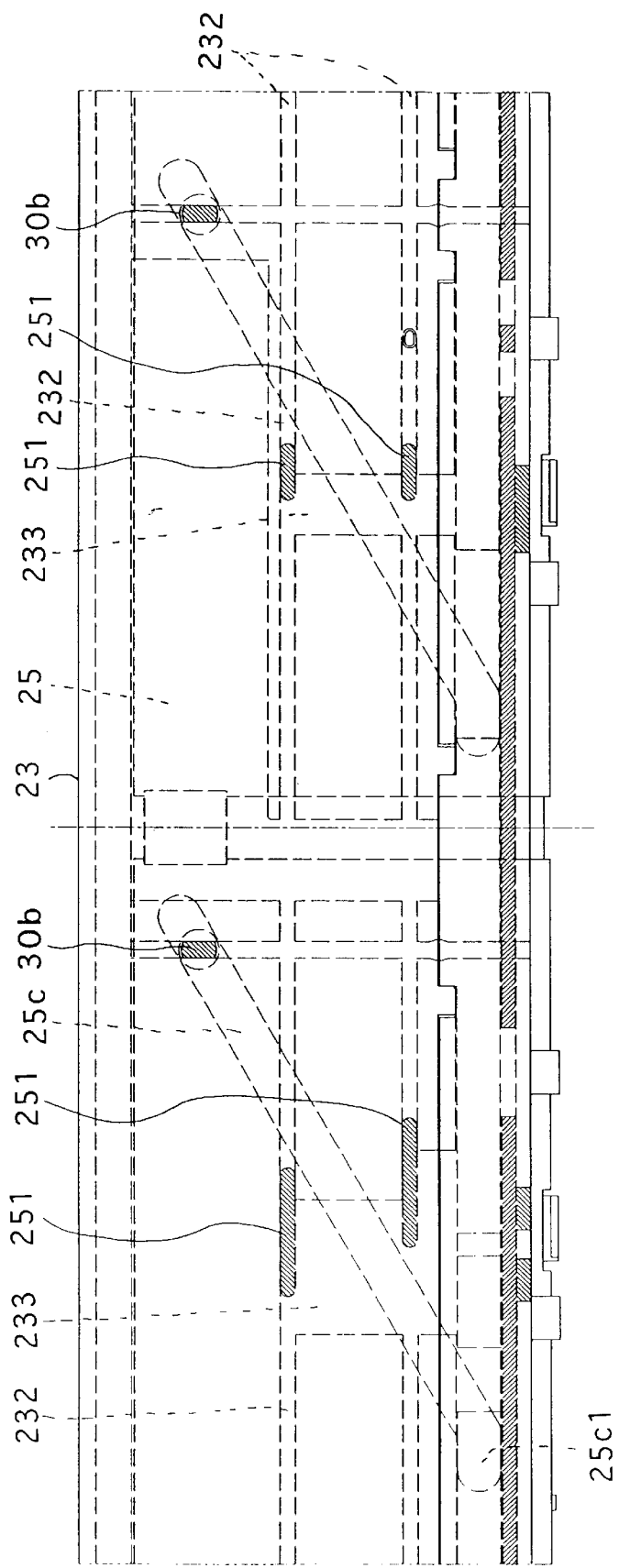
FIG. 15 is an explanatory developed view showing engagement of the second outer barrel, the second helicoid ring, the second linear guide ring and the guide heads, in a telephoto extremity position of the zoom lens barrel assembly.

By further driving the zooming motor 15 in the direction to extend the barrels, the zoom lens barrel assembly is brought into the telephoto extremity position. The second outer barrel 23, the second helicoid ring 21, the second linear guide ring 25 and the guide heads 30b in the telephoto extremity position are shown in FIG. 15 in a developed view similar to FIG. 14. In the telephoto extremity position, while a portion of each key 251 has come out from the circumferential groove 232 into a free space 233, a portion of each key 251 still remains in the circumferential groove 232. Accordingly, the second outer barrel 23 is prevented from moving with respect to the second linear guide ring 25 along the optical axis (thus, the second outer barrel 23 does not come off the second linear guide ring 25). In other words, the second outer barrel 23 and the second linear guide ring 25 can rotate relative to each other but advance or retreat together along the optical axis.

At this stage, when the zooming motor 15 is driven in the direction to extend the barrels, the gear teeth 14b of the first helicoid ring 14 engage with the telephoto extremity stopper 101 and prevent the first helicoid ring 14 from rotating further.

By removing the telephoto extremity stopper 101, the first helicoid ring 14 is made to move freely so that the zooming motor 15 can be further driven to extend the barrels.

Figure 16:
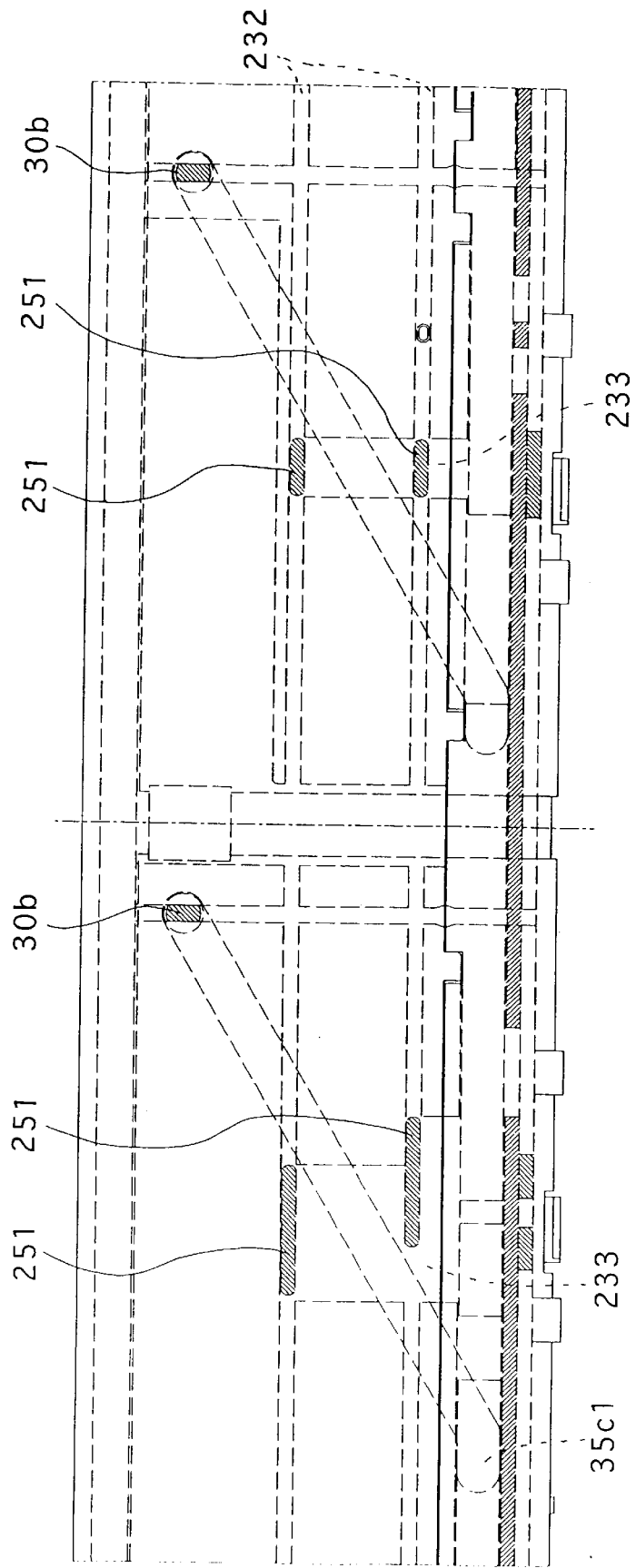
FIG. 16 is an explanatory developed view showing engagement of the second outer barrel, the second helicoid ring, the second linear guide ring and the guide heads, in an assembly/disassembly position of the zoom lens barrel assembly.

From the above-described telephoto extremity position, the zoom lens barrel assembly is brought into the assembly/disassembly position by removing the telephoto extremity stopper (not shown) and further driving the zooming motor 15 in the direction to extend the barrels. The second outer barrel 23, the second helicoid ring 21, the second linear guide ring 25 and the guide heads 30b in the assembly/disassembly position are shown in FIG. 16 in a developed view similar to FIG. 14. In the assembly/disassembly position, each key 251 has come out of the circumferential groove 232 and is entirely in the free space 233. Thus, in the assembly/disassembly position, the second outer barrel 23 can be moved with respect to the second linear guide ring 25 along the optical axis. In other words, the second outer barrel 23 can be removed from (see FIG. 17) or mounted back onto the second linear guide ring 25 (FIG. 16).

By pulling out the first and the second outer barrels 17 and 23 in the assembly/disassembly position, the guide heads 21b and 30b can be externally exposed (see FIG. 6). Once the guide heads 21b and 30b have been removed (see FIG. 7), the third outer barrel 30, the second helicoid ring 21, and the first helicoid ring 14 can be further rotated to extend further outward for removal by the action of the helicoids. Thus, the zoom lens barrel assembly can be disassembled when in the assembly/disassembly position.

The zoom lens barrel assembly of the present invention is integrated with the camera body and is constructed such that when the zoom lens barrel is assembled to allow the camera to take pictures, rotation of the zooming motor 15 is controlled to prevent the lens barrel assembly from extending out past the telephoto photographing position to the assembly/disassembly position. If the camera needs repairing, the zooming motor 15 can be made to operate to bring the zoom lens barrel assembly from the telephoto photographing position into the assembly/disassembly position by, for example, entering special commands.

In this embodiment, as with the second outer barrel 23 and the second linear guide ring 25, the first outer barrel 17 and the first linear guide ring 18 have circumferential grooves 172, free spaces 173, and keys 181. The first outer barrel 17 can be removed from, and mounted onto, the first linear guide ring 18 in the above-described assembly/disassembly position.

A lens barrier mechanism for opening and closing the barrel opening in front of the first lens group L1 is arranged in the front portion of the fourth outer barrel 31. The lens barrier mechanism includes a cosmetic plate 90 secured to the front portion of the fourth outer barrel 31, a barrier drive ring 91, which is retained in a front wall 31b (see FIG. 2) of the fourth outer barrel 31 and can rotate about the optical axis O, a pair of outer barriers 92 and a pair of inner barriers 93, which are each rotatably supported between the barrier drive ring 91 and the cosmetic plate 90. The cosmetic plate 90 includes a projection (not shown) for rotatably supporting the outer barriers 92 and the inner barriers 93. The outer barriers 92 and the inner barriers 93 pivot about the projection and cooperate to open and close the opening of the cosmetic plate 90. A barrier biasing spring 94 biases each pair of the barriers 92 and 93 to close.

The barrier drive ring 91 includes a pair of barrier projections 91a arranged at diametrically opposite ends, and a lug arm 91b extending rearward in the optical axis direction. The barrier projections 91a engage with the outer barriers 92 or the inner barriers 93 to transmit rotation of the barrier drive ring 91 to the barriers 92 and 93. The lug arm 91b is inserted through a hole (not shown) formed in the front wall 31b arranged on the inner periphery of the front portion of the fourth outer barrel 31 into the fourth outer barrel 31. The lug arm 91b is shaped to slide against a guide slope 33e formed on the front end of the partial cylindrical arm member 33b of the third linear guide ring 33.

A drive ring biasing spring 95 biases the barrier drive ring 91 to rotate to open the barriers 92 and 93. The drive ring biasing spring 95 exerts a larger force than the barrier biasing spring 94. Thus, when the barrier drive ring 91 is free to rotate by the biasing force of the drive ring biasing spring 95, the biasing force of the drive ring biasing spring 95 is transmitted through the barrier drive ring 91, at transmitted to the barriers 92 and 93 via the barrier projection 91a, so that the barriers 92 and 93 are held open against the biasing force of the barrier biasing spring 94. When the zoom lens barrel assembly is in a photographing position between the wide-angle extremity as shown in FIG. 3 and the telephoto extremity as shown in FIG. 4, the lug arm 91b is not in contact with the guide slope 33e and the barrier drive ring 91 remains free, so that the barriers 92 and 93 are held open.

Figure 31:
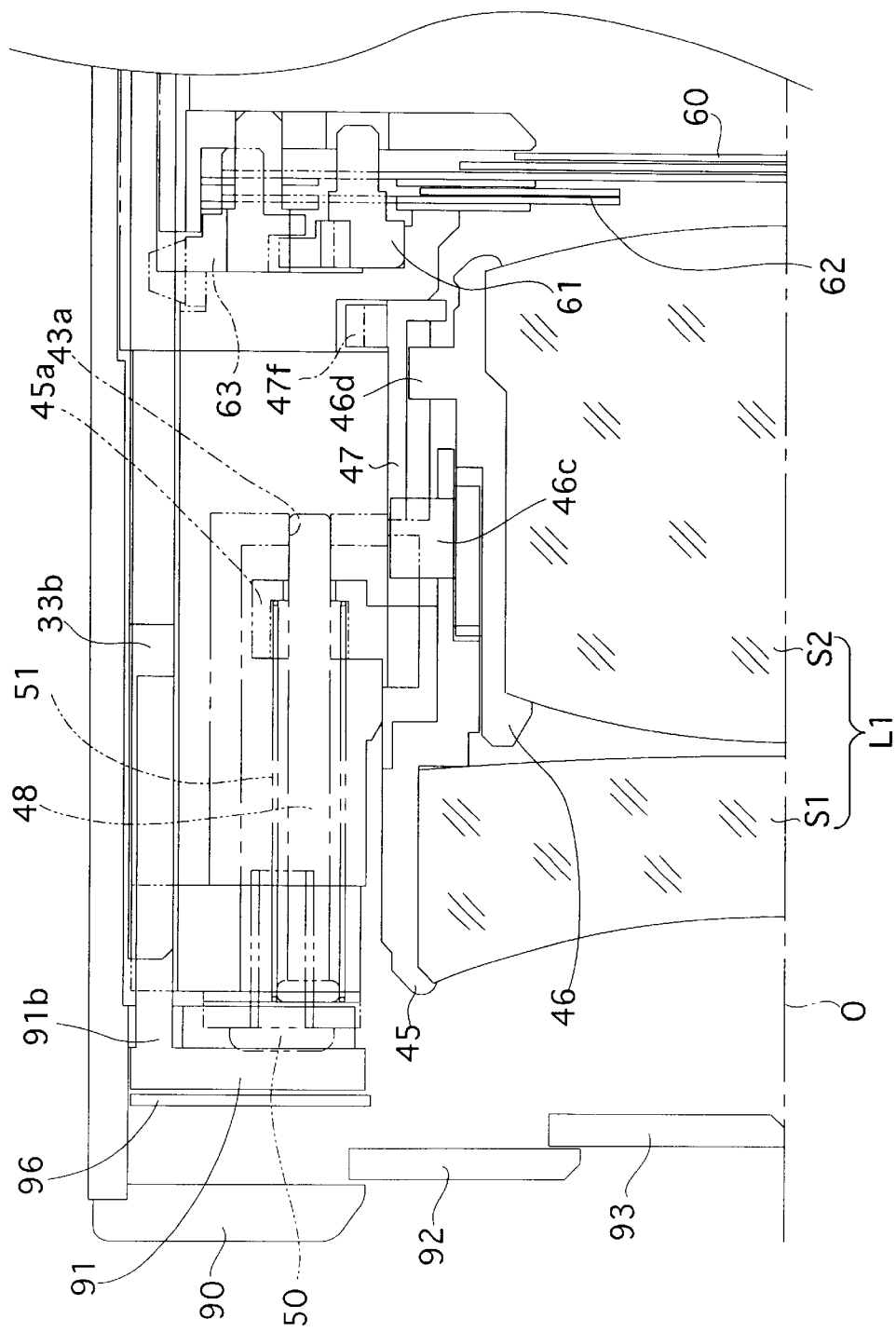
FIG. 31 is an enlarged partial cross-section of the upper end of the zoom lens barrel assembly showing adjacent area of a shutter unit with lens barriers closed.
Figure 32:
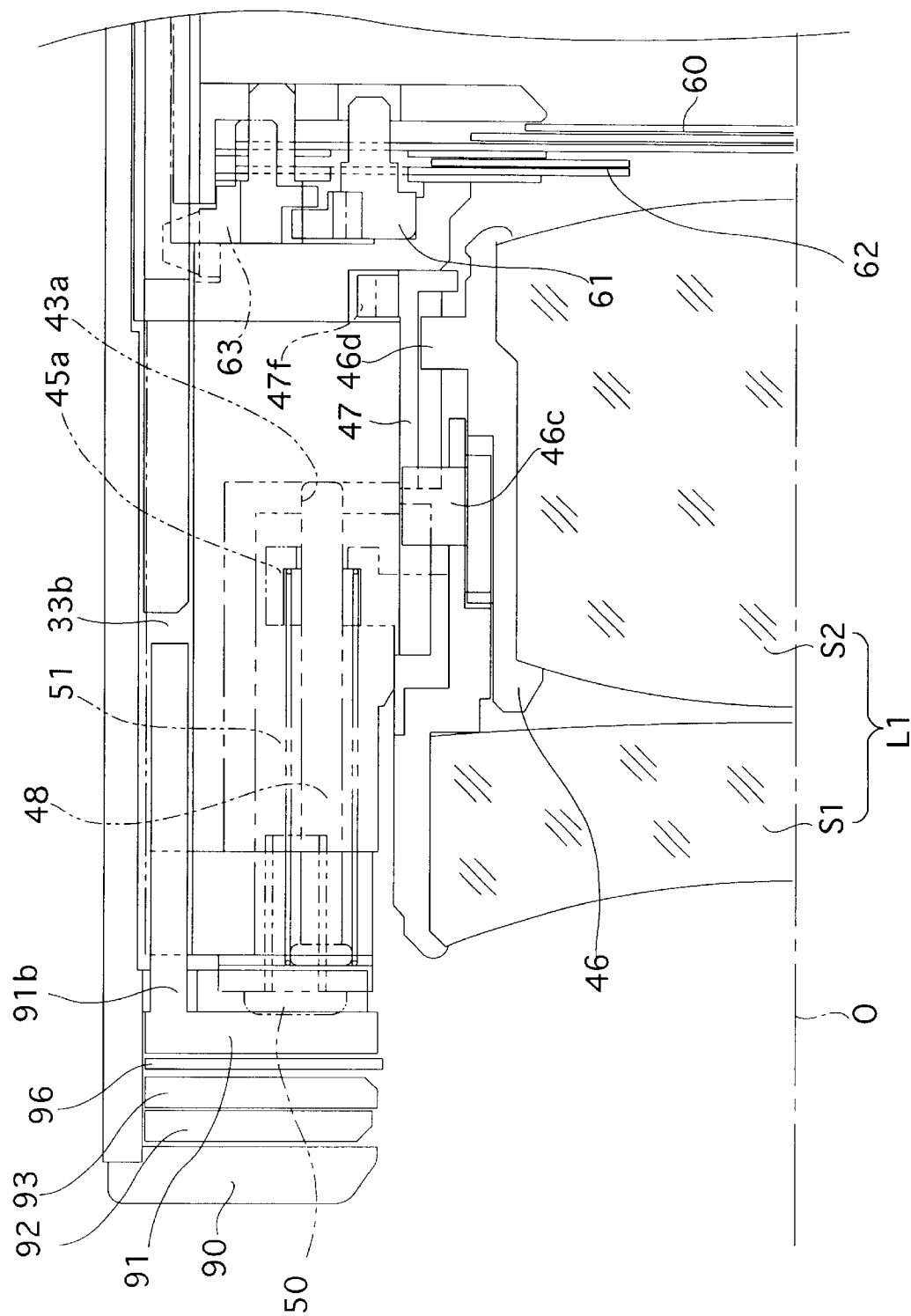
FIG. 32 is an enlarged partial cross-section of the upper end of the zoom lens barrel assembly similar to FIG. 24, with the lens barriers open.

As the zoom lens barrel assembly shifts from the wide-angle extremity position as shown in FIGS. 3 and 32 to the retracted position as shown in FIGS. 2 and 31, the guide slope (barrier drive surface) 33e (see FIG. 9) of the third linear guide ring 33 comes into contact with the lug arm 91b of the barrier drive ring 91 and starts sliding against the lug arm 91b. As a result, the barrier drive ring 91 is forcibly rotated against the drive ring biasing spring 95 as it follows the guide slope 33e. This allows the barriers 92 and 93 to rotate and close. Since the barriers 92 and 93 are released from the restriction of the barrier drive ring 91 and are biased by the biasing force of the barrier biasing spring 94, each pair of the barriers 92 and 93 rotate to close and remain closed.

When the zoom lens barrel assembly shifts from the wide-angle extremity position to the retracted position, slip sections are utilized so that the third outer barrel 30 and the second outer barrel 23, and the second outer barrel 23 and the first outer barrel 17, rotate together and do not move relative to one another along the optical axis. In the present embodiment, before the entire zoom lens barrel assembly retreats to the retracted position, i.e., before the fourth outer barrel 31 retreats to the retracted position thereof with respect to the third outer barrel 30, the second outer barrel 23 retreats along the optical axis to the retracted position thereof with respect to the first outer barrel 17, and enters the slip section thereof (i.e., the slip region 25c1 of the second linear guide ring 25), and thereafter starts retreating while rotating together with the first outer barrel 17; subsequently, the third outer barrel 30 retreats along the optical axis to the retracted position thereof with respect to the second outer barrel 23 and enters the slip section thereof; and the third outer barrel 30, the second outer barrel 23, and the first outer barrel 17 start retreating toward the retracted position while rotating together. Accordingly, either at substantially the same time or after the guide slope 33e of the third linear guide ring 33 comes into contact with the lug arm 91b of the barrier drive ring 91 and starts sliding against the lug arm 91b, the second outer barrel 23 and then the third outer barrel 30 reach their respective slip sections. As a result, the fourth outer barrel 31 retreats due to the relative rotation of the fourth outer barrel 31 with respect to the third linear guide ring 33. Thus, the fourth outer barrel 31 and the third outer barrel 30, and thus the third linear guide ring 33, move along the optical axis relative to each other. This causes the barrier drive ring 91 to rotate to thereby close the barriers 92 and 93.

Conversely, when the zoom lens barrel assembly extends out from the retracted position to the wide-angle extremity position, the first, the second, and the third outer barrels 17, 23 and 30, respectively extend out along the optical axis while rotating together. However, the second outer barrel 23 and the third outer barrel 30, when in each slip section thereof, extend out together with the first outer barrel 17 toward the wide-angle extremity while rotating together with the first outer barrel 17, whereas the fourth outer barrel 31 extends out toward the wide-angle extremity with respect to the third outer barrel 30 without relatively rotating. When the second outer barrel 23 and the third outer barrel 30 are in the slip sections thereof, the guide slope 33e of the third linear guide ring 33 moves away from the lug arm 91b so that the barrier drive ring 91, actuated by the biasing force of the drive ring biasing spring 95, rotates to open the barriers 92 and 93. As a result, the guide slope 33e moves away from the lug arm 91b and the barriers 92 and 93 are completely open before the zoom lens barrel assembly reaches the wide-angle extremity.

When the zoom lens barrel assembly extends out from the retracted position to the wide-angle extremity position, the third outer barrel 30 exits the slip section first. Thereafter, the third outer barrel 30 starts to extend with respect to the second outer barrel 23. Subsequently, the second outer barrel 23 exits the slip section thereof (i.e., the slip region 25c1 of the second linear guide ring 25), causing the second outer barrel 23 to start extending out with respect to the first outer barrel 17.

As described above, the opening/closing of the barriers 92 and 93 is effected by the stroke, i.e., the relative displacement between the fourth outer barrel 31 and the third outer barrel 30 along the optical axis that occurs as the zoom lens barrel assembly shifts from the retracted position to the wide-angle extremity position. Accordingly, an alternative construction is possible wherein the slip section is not provided in the third outer barrel 30 and/or the second outer barrel 23. A large stroke is desirable for opening and closing the barriers 92 and 93 since too small a stroke can result in an excessively large driving torque. However, increasing the stroke length increases the rotation angle of the third outer barrel 30 required for opening/closing of the barriers, and as a result, the fourth outer barrel 31 extends by an excessively large amount with respect to the camera body, which can exceed the required amount for shifting the lens barrel assembly from the retracted position to the wide-angle extremity position.

Though the slip section may be provided only in the helicoid structure of the third outer barrel 30, such a construction can result in a small stroke for the rotation angle of the lens barrel required for the extension of the lens barrel assembly from the retracted position to the wide-angle extremity position. Therefore, in such a case, the slip section needs to have a large rotation angle. Furthermore, in such a construction, relative displacement of the fourth outer barrel 31 with respect to the third outer barrel 30 along the optical axis becomes large, so that the part of the FPC 80 that extends across the third outer barrel 30 may be unfavorably tensed unless sufficient play is provided (refer to FIGS. 2 and 3).

To cope with such problems, the helicoid slip sections are provided both in the second outer barrel 23 and in the third outer barrel 30 in the present embodiment in order to ensure a large rotation angle of the lens barrel assembly as the lens barrel assemble shifts from the retracted position to the wide-angle extremity position. In this manner, sufficient relative displacement along the optical axis of the fourth outer barrel 31 with respect to the third outer barrel 30 is achieved for the small lead of the cam for sending out the fourth outer barrel 31.

Figure 19:
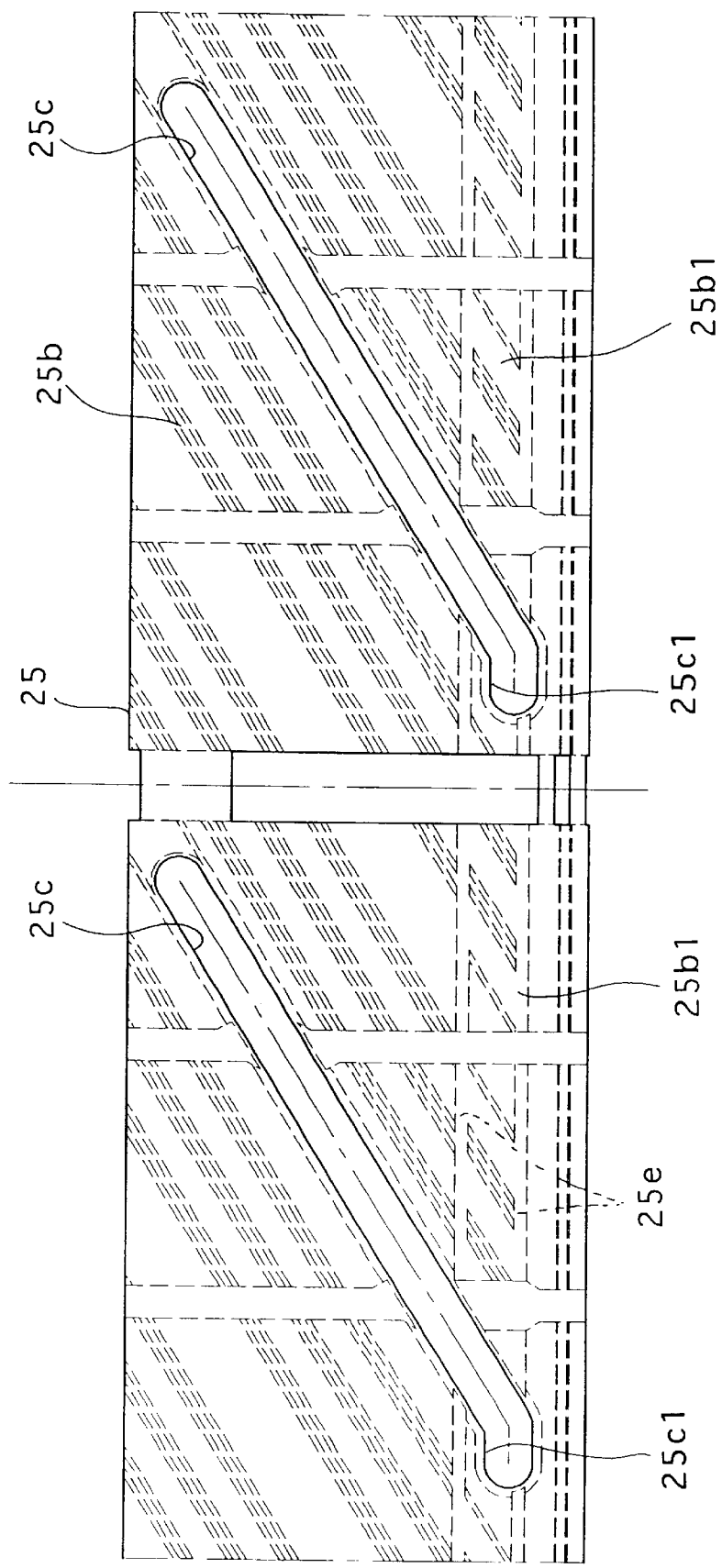
FIG. 19 is a developed view showing the second linear guide ring of the zoom lens barrel assembly.
Figure 20:
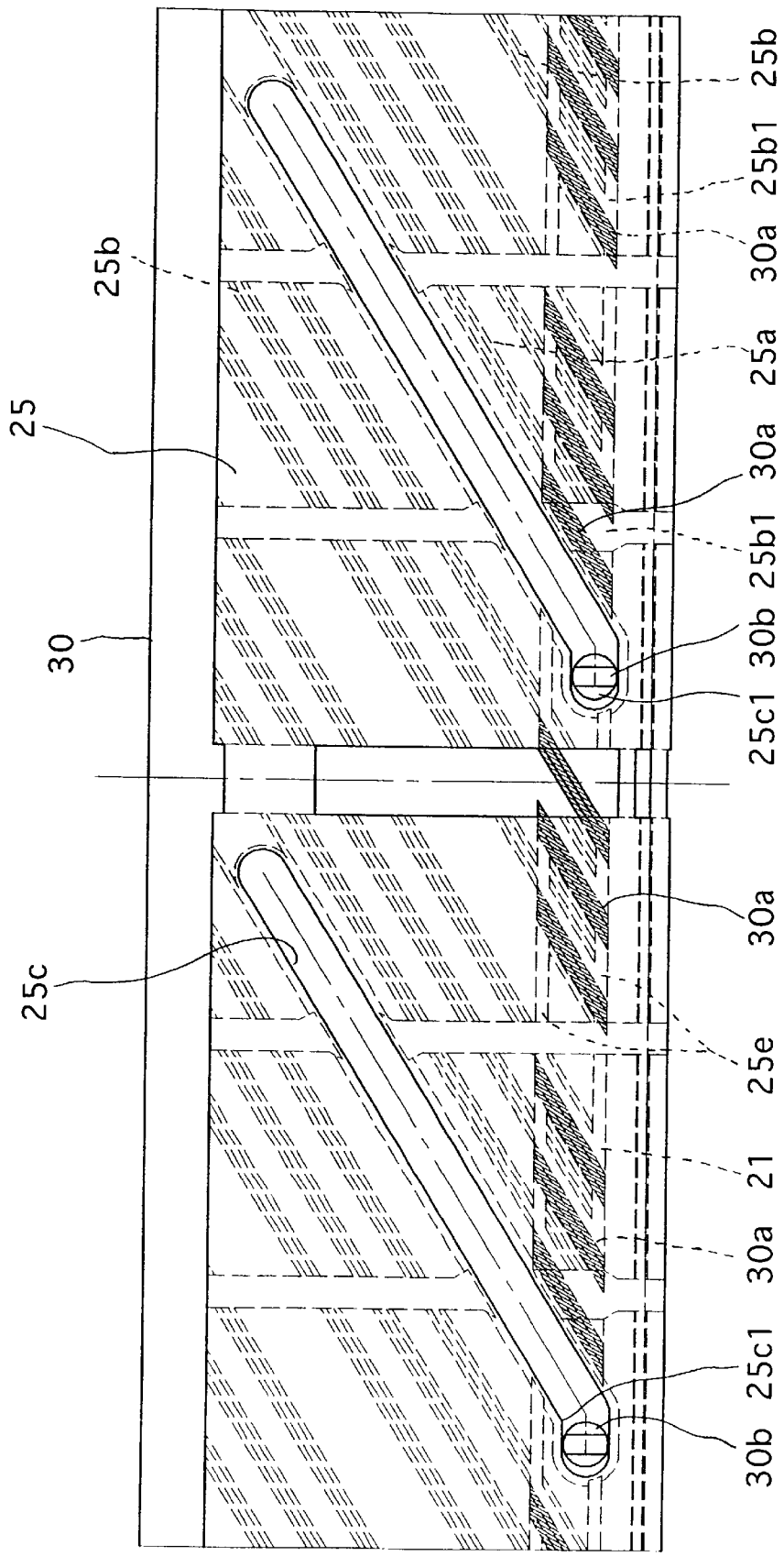
FIG. 20 is a developed view showing engagement of female helicoids of the second linear guide ring with male helicoids of the third outer barrel in the retracted position of the zoom lens barrel assembly.
Figure 21:
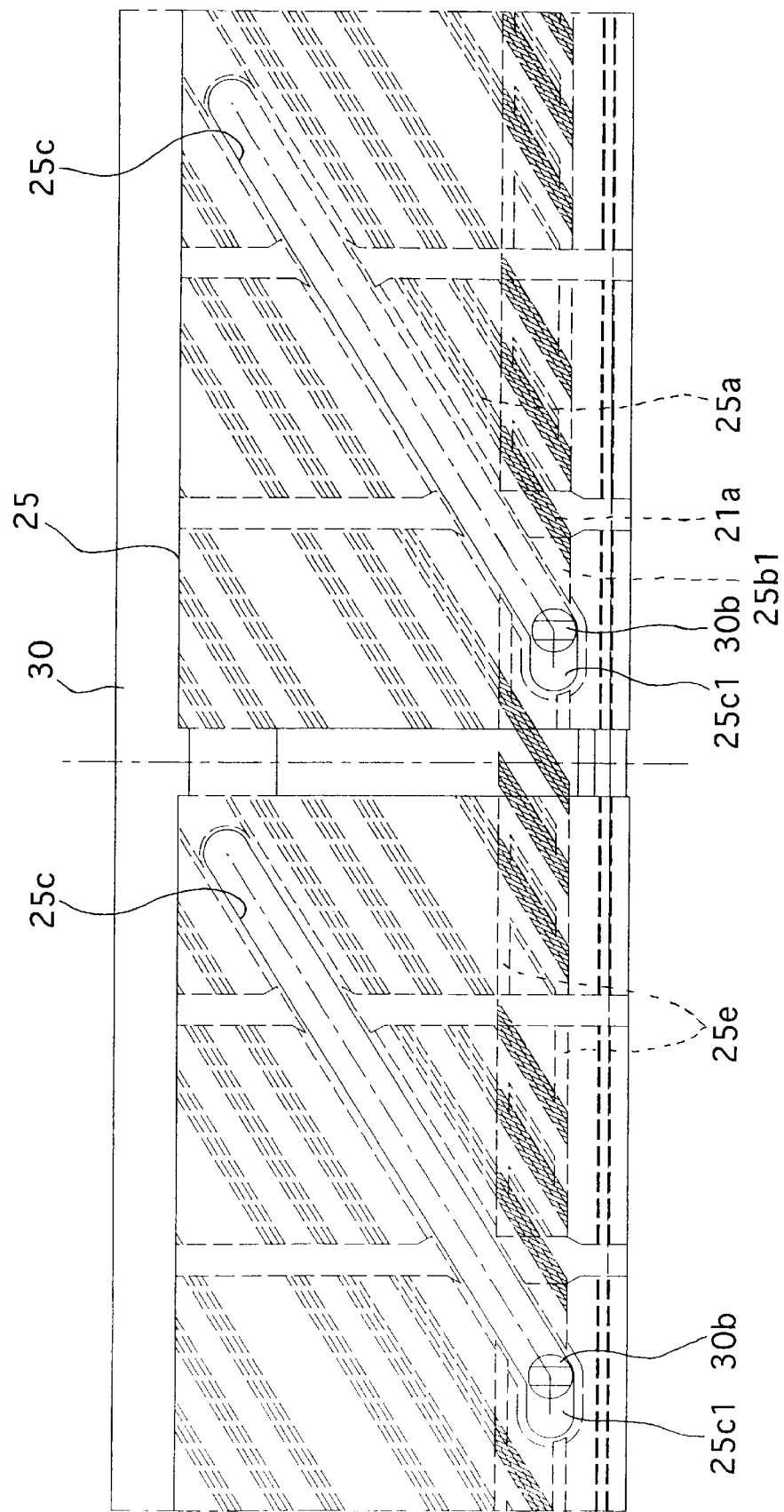
FIG. 21 is a developed view showing engagement of the female helicoids of the second linear guide ring with the male helicoids of the third outer barrel, when the zoom lens barrel assembly extends to a slip section boundary position.
Figure 22:
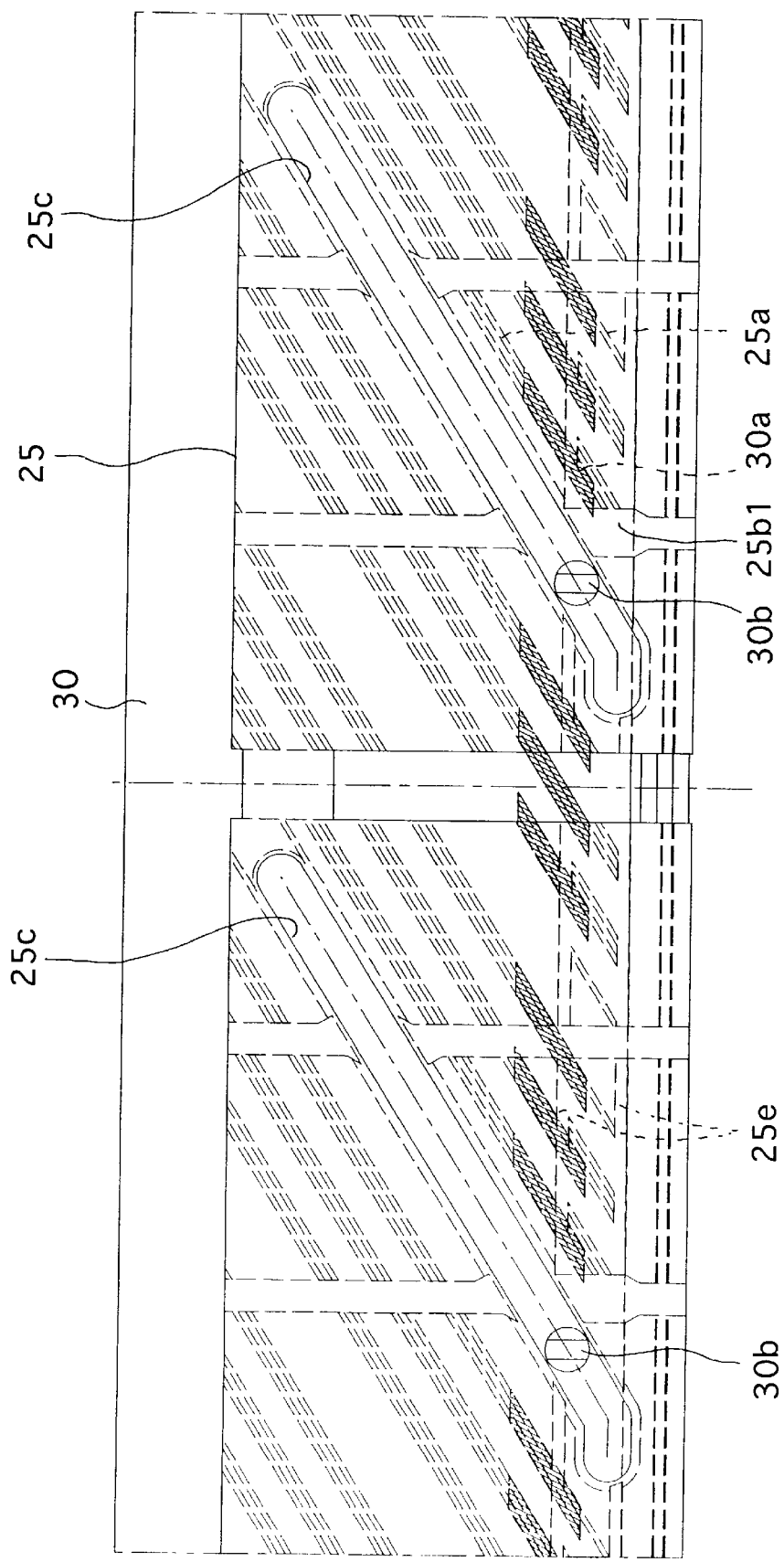
FIG. 22 is a developed view showing engagement of the female helicoids of the second linear guide ring with the male helicoids of the third outer barrel, when the zoom lens barrel assembly extends to a wide-extremity position.
Figure 23:
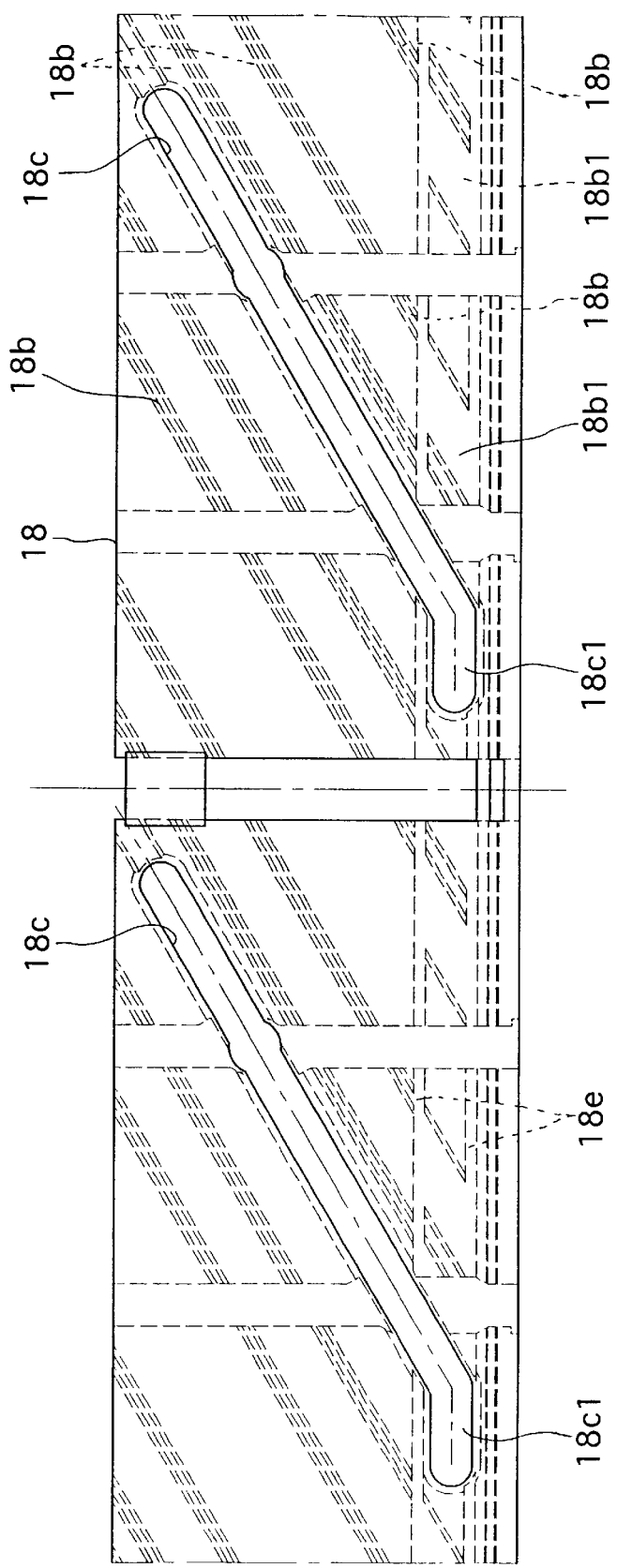
FIG. 23 is a developed view of the first linear guide ring of the zoom lens barrel assembly.
Figure 24:
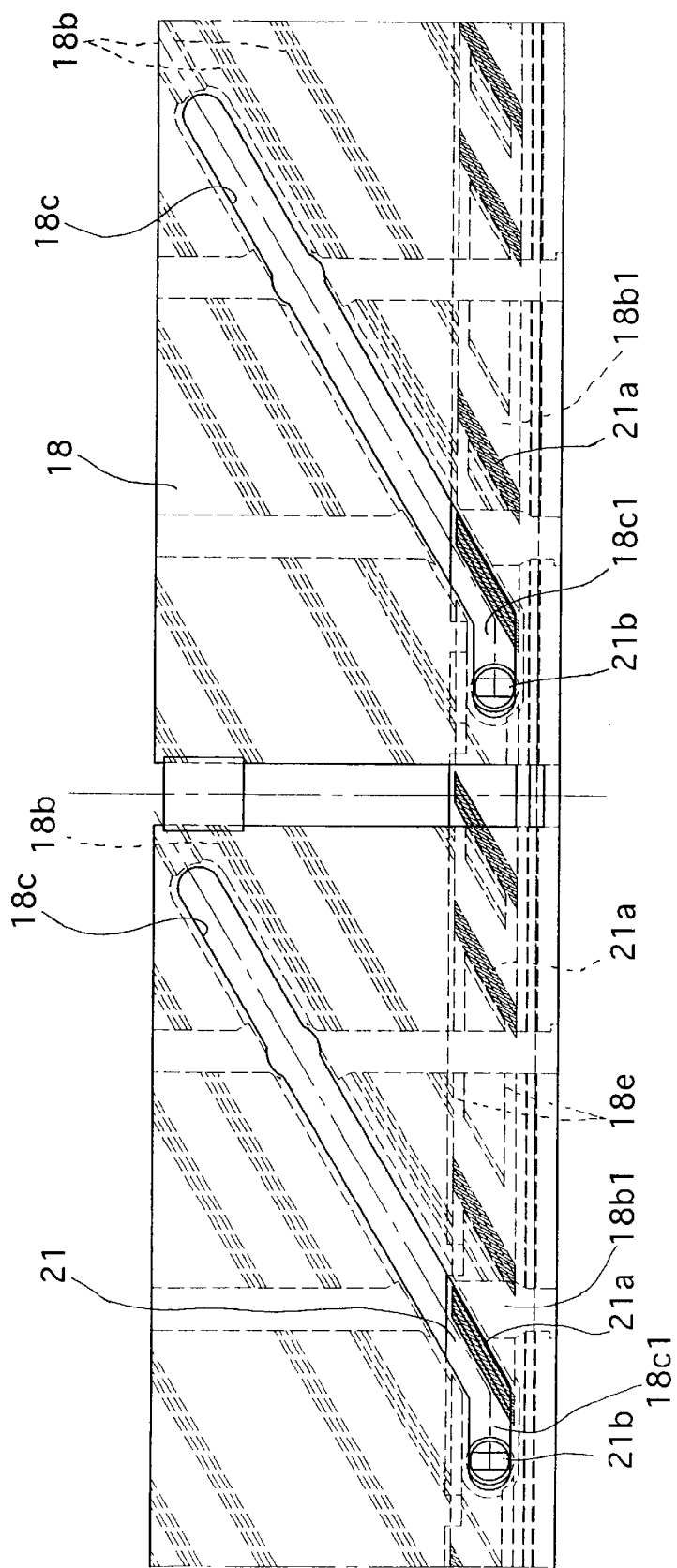
FIG. 24 is a developed view showing engagement of the first linear guide ring, the second outer barrel and the second helicoid ring, when the zoom lens barrel assembly is in the retracted position.
Figure 25:
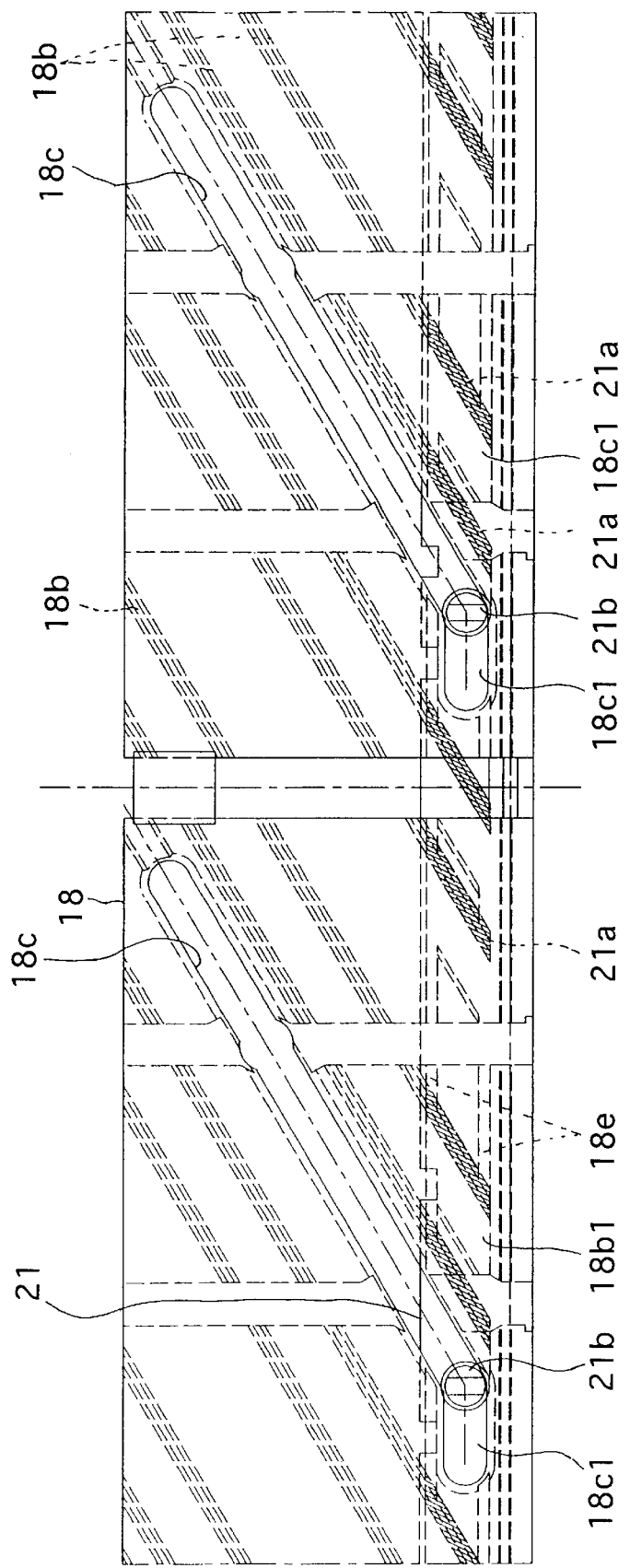
FIG. 25 is a developed view showing engagement of the first linear guide ring, the second outer barrel and the second helicoid ring, when the zoom lens barrel assembly is in the slip section boundary position.
Figure 26:
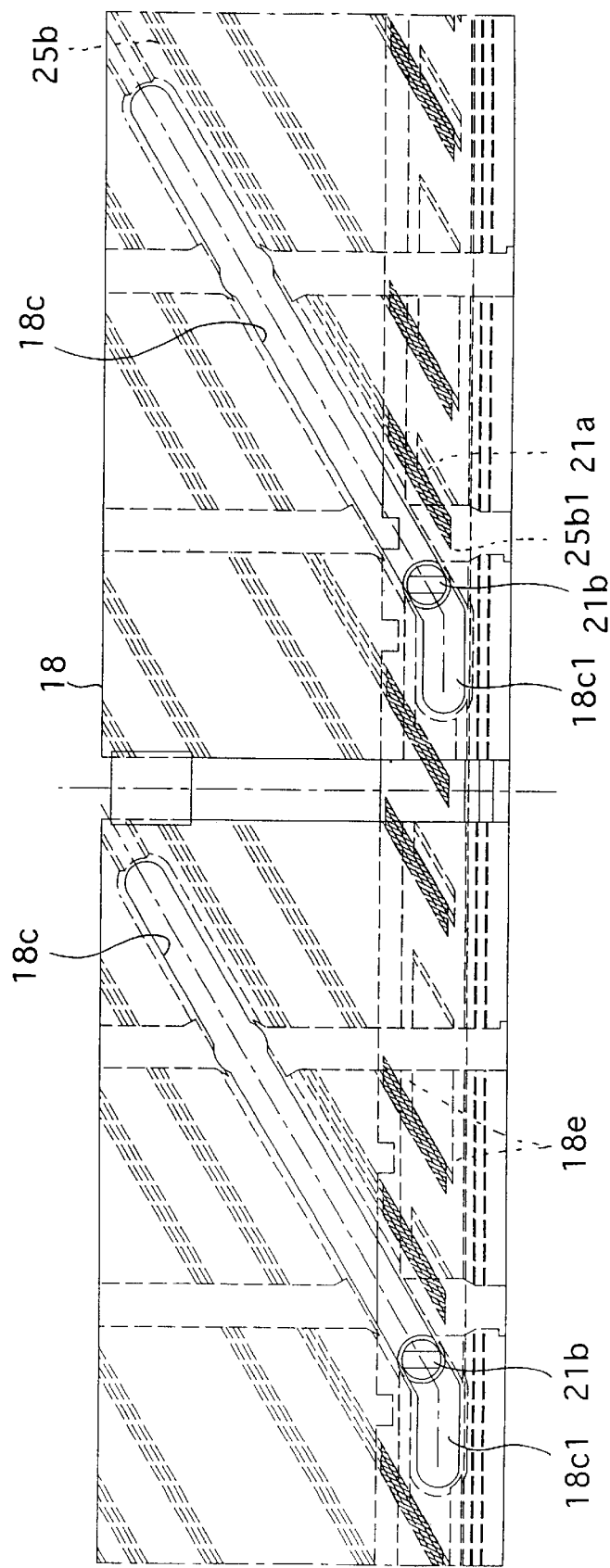
FIG. 26 is a developed view showing engagement of the first linear guide ring, the second outer barrel and the second helicoid ring, when the zoom lens barrel assembly is in the wide-angle extremity position.
Figure 27C:
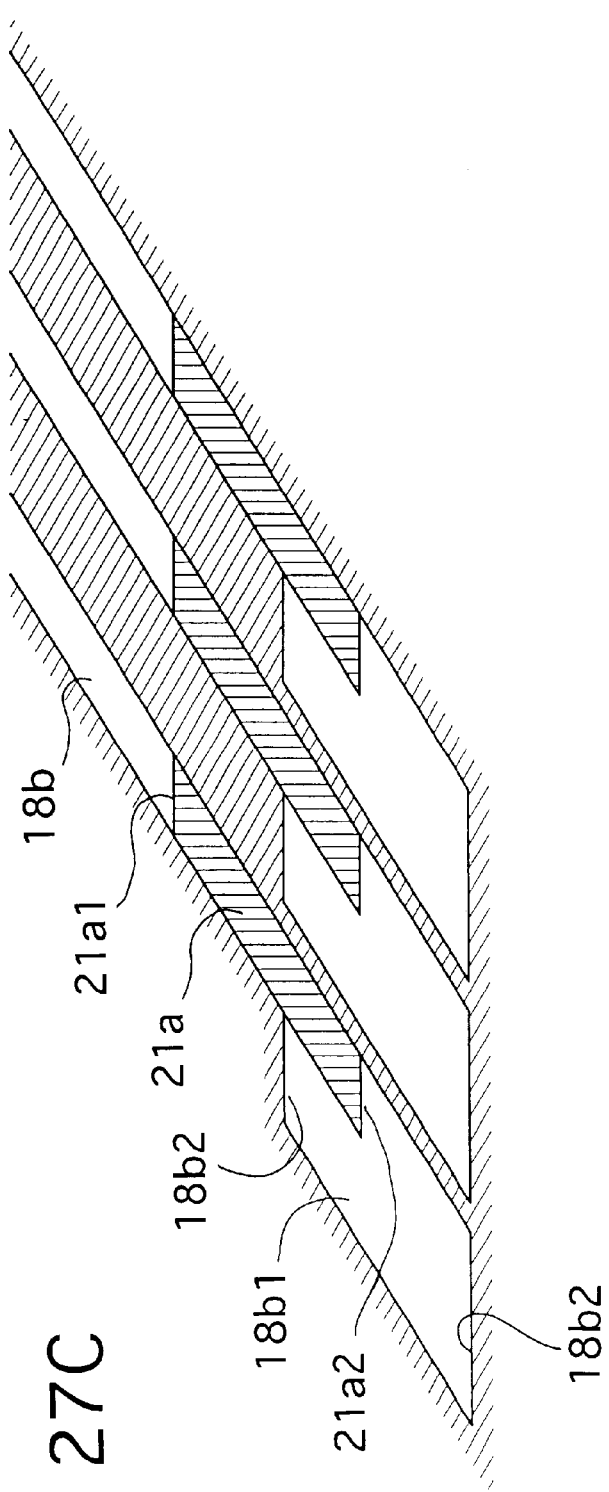
FIG. 27C is an explanatory view showing engagement of the female helicoids and the helicoid slip section of the first linear guide ring, and the male helicoids of the second helicoid ring of the zoom lens barrel assembly when the lens barrel assembly is in the wide-angle extremity position.

Construction of the slip section of the helicoids will now be described with reference to FIGS. 18 through 27. FIG. 18A is a perspective view showing a longitudinal cross-section of the second linear guide ring 25. FIG. 18B is a perspective view showing a longitudinal cross-section of the first linear guide ring 18. FIG. 19 is a developed view of the second linear guide ring 25. Each of FIGS. 20 through 22 is a developed view showing a relationship between the second linear guide ring 25 and the third outer barrel (cam/helicoid ring) 30. FIG. 23 is a developed view of the first linear guide ring 18. Each of FIGS. 24 through 26 is a developed view showing a relationship between the first linear guide ring 18, the second outer barrel 23, and the second helicoid ring 21. Each of FIGS. 27A, 27B and 27C is an enlarged view showing the female helicoids 25b and helicoid slip sections 25b1 of the second linear guide ring 25, and the male helicoids 30a of the third outer barrel 30.

As shown in FIG. 19, the female helicoid 25b on the inner periphery of the second linear guide ring 25 includes a wide (in the circumferential direction) helicoid slip section 25b1 near the rear end (camera body side) of the second linear guide ring 25. The helicoid slip section 25b1 has substantially the same length as the male helicoid 30a of the third outer barrel 30 in the optical axis direction. Accordingly, as shown in FIG. 20, as the male helicoid 30a proceeds into the helicoid slip section 25b1, the male helicoids 30a and the female helicoids 25b are released from the confinement of the flanks thereof, so that the second linear guide ring 25 and the third outer barrel 30 can rotate relative to each other with the relative movement along the optical axis being prevented. The guide slot 25c also includes the slip section 25c1 to permit the rotation in the helicoid slip section 25b1.

Although the helicoid slip section 25b1 is designed to permit no movement of the male helicoid 30a along the optical axis, helicoid slip section 25b1 can be designed to permit a slight movement of the male helicoid 30a along the optical axis. Furthermore, the helicoid slip section 25b1 can include a thrust surface 25b2 (see FIG. 28A) and the front and the rear end surfaces of the male helicoid 30a may be configured as a flank surface to slide against the thrust surface 25b2.

When the zoom lens barrel assembly is in the retracted position, the male helicoids 30a for engaging the female helicoids 25b are located in the respective helicoid slip sections 25b1, and the guide heads 30b placed through the guide slots 25c are located in the respective slip sections 25c1 (see FIG. 20). As the zoom lens barrel assembly extends out from the retracted position toward the wide-angle extremity, the third outer barrel 30, the male helicoids 30a, and the guide heads 30b move with respect to the second linear guide ring 25 toward the wide-angle position (toward the right-hand side in FIGS. 20 through 22). With the male helicoids 30a confined in the respective helicoid slip sections 25b1, the third outer barrel 30 can only rotate with respect to the second linear guide ring 25, and the zoom lens barrel assembly proceeds to a position in which the male helicoids 30a are positioned at the boundaries of the slip sections (slip section boundary position)(see FIG. 21). When the zoom lens barrel assembly is in the slip section boundary position, the male helicoids 30a engage with the female helicoid 25b by their flanks.

As the zoom lens barrel assembly further extends out from the slip section boundary position toward the wide-angle extremity position, the third outer barrel 30, with the male helicoids 30a confined by the female helicoids 25b, moves forward with respect to the second linear guide ring 25 (toward the top of FIGS. 20 through 22) while rotating and being led by the female helicoids 25b. As a result, the zoom lens barrel assembly proceeds to the wide-angle extremity position (FIG. 22).

Although the male helicoids 30a are formed on the third outer barrel 30 and female helicoids 25b are formed on the second linear guide ring 25 in the present embodiment, male helicoids can be formed on the second linear guide ring 25 and female helicoids can be formed on the third outer barrel 30.

As with the second linear guide ring 25 and the third outer barrel 30, the first linear guide ring 18, the second outer barrel 23 and the second helicoid ring 21 include slip sections.

As shown in FIG. 23, the female helicoid 18b on the inner periphery of the first linear guide ring 18 has a wide (as viewed in the circumferential direction) helicoid slip section 18$b$1 near the rear end (camera body side) of the first linear guide ring 18. The helicoid slip section 18$b$1 has substantially the same length as the male helicoid 21$a$ of the second helicoid ring 21 in the optical axis direction. Accordingly, as shown in FIG. 24, as the male helicoid 21$a$ proceeds to the helicoid slip section 18$b$1, the male helicoids 21$a$ and the female helicoids 18$b$ are released from the confinement of the flanks thereof, so that the first linear guide ring 18 and the helicoid ring 21 (and thus the second outer barrel 23) can rotate relative to each other with the relative movement along the optical axis being prevented. The guide slot 18$c$ also includes a slip section 18$c$1 which corresponds to the helicoid slip section 18$b$1 and has no lead angle.

When the zoom lens barrel assembly is in the retracted position, the male helicoids 21$a$ for engaging with the female helicoids 18$b$ are located in the respective helicoid slip sections 18$b$1, and the guide heads 21$b$ placed through the guide slots 18$c$ are located in the respective slip sections 18$c$1 (see FIG. 24 and FIG. 27A). As the zoom lens barrel assembly extends out from the retracted position toward the wide-angle extremity, the male helicoids 21$a$ and the guide heads 21$b$, and thus the helicoid ring 21 and the second outer barrel 23, move with respect to the first linear guide ring 18 toward the wide-angle position (toward the right-hand side in FIGS. 24 through 26). During this relative movement, with the male helicoids 21$a$ and the guide heads 21$b$ located in the helicoid slip sections 18$b$1 and in the slip sections 18$c$1, respectively, the second outer barrel 23 and the second helicoid ring 21 can only rotate with respect to the first linear guide ring 18, and the zoom lens barrel assembly proceeds to a position in which the male helicoids 21$a$ are positioned at the boundaries of the slip sections (slip section boundary position) (see FIG. 25 and FIG. 27B). When the zoom lens barrel assembly is in the slip section boundary position, the male helicoids 21$a$ engage with the female helicoids 18$b$ by their flanks.

As the zoom lens barrel assembly further extends out from the slip section boundary position toward the wide-angle extremity position, the second outer barrel 23 and the second helicoid ring 21, with the male helicoids 21$a$ confined by the female helicoids 18$b$, move forward with respect to the first linear guide ring 18 (toward the top of FIGS. 24 through 26) and rotate while being led by the male helicoids 21$a$, the female helicoids 18$b$, and the guide slots 18$c$. As a result, the zoom lens barrel assembly proceeds to the wide-angle extremity position (shown in FIG. 26 and FIG. 27C).

In this embodiment, the third outer barrel 30 also has slip sections since the slipping of only the second outer barrel 23 is insufficient for the opening/closing of the barriers 92 and 93. For the third outer barrel 30, the slip sections are provided for the minimizing the amount of barrel advancement and adjusting the balance of barrel advancement.

Furthermore, in the present embodiment, the slip angle of the helicoid slip section 18$b$1 for slipping the second outer barrel 23 and the helicoid ring 21 is set to be larger than the slip angle of the helicoid slip section 25$b$1 for slipping the third outer barrel 30. If the third outer barrel 30 and the second outer barrel 23 simultaneously shift from the slip section to the helicoid section, the applied load increases significantly. This effect can be reduced by the above construction.

As described above, in the zoom lens barrel assembly of the present invention, the opening/closing of the barriers 92 and 93 are performed by the slip motions of the third outer barrel 30, the second outer barrel 23 and the relative movement of the fourth outer barrel 31 along the optical axis. In the zoom lens barrel assembly of the present embodiment, the movement of the barrier drive ring 91 for closing and opening the barriers 92 and 93 is caused by two actions, namely, the stroke action of the fourth outer barrel 31 that takes place as the barrel assembly shifts between the retracted position and the wide-angle extremity position, and the slip action of the third outer barrel 30 and the second outer barrel 23 that takes place in the respective slip sections between the retracted position and the wide-angle extremity position. Accordingly to this construction, the long stroke length of the fourth outer barrel 31 is utilized.

Referring to FIG. 28A, a part of the female helicoids 18$b$ of the first linear guide ring 18 is shown in an enlarged view in the vicinity of the helicoid slip sections 18$b$1. In general, the first linear guide ring 18 is made by injection-molding a plastic material. Accordingly, a mold is machined via electrospark machining. During the electrospark machining process, however, corners, such as those of the helicoid slip sections 18$b$1, are rounded (indicated by R in FIG. 28B). If the corners of the helicoid slip sections 18$b$1 are rounded, the length of each thrust surface 18$b$2 of the helicoid slip section 18$b$1 along the circumference of the barrel is reduced as well as the contact area with the male helicoid 21$a$. As a result, the surfaces interfere with the male helicoids 21$a$. Furthermore, if the corners of the helicoid slip sections 18$b$1 are rounded, the thrust surfaces 18$b$2 can no longer support the male helicoid 21$a$ against the thrust force thereof with sufficient stability.

However, in the present embodiment, a circumferential groove 18$e$ is formed along each of the front and the rear thrust surfaces 18$b$2 of the helicoid slip section 18$b$1, the surfaces being spaced apart from each other in the optical axis direction. As shown in FIG. 28C, this construction eliminates the problem of rounded corners. The circumferential groove 18$e$ is formed to be wide enough (in the optical axis direction) to eliminate the rounded corners. Preferably, the width is substantially the same as the radius of curvature of the rounded corner that would otherwise be formed by electrospark machining.

In one embodiment, a circumferential groove 25$e$ similar to the circumferential groove 18$e$ of the first linear guide ring 18 is formed along each of the front and the rear thrust surfaces 25$b$2 of each of the helicoid-slip section 25$b$1 of the second linear guide ring 25.

Figure 29:
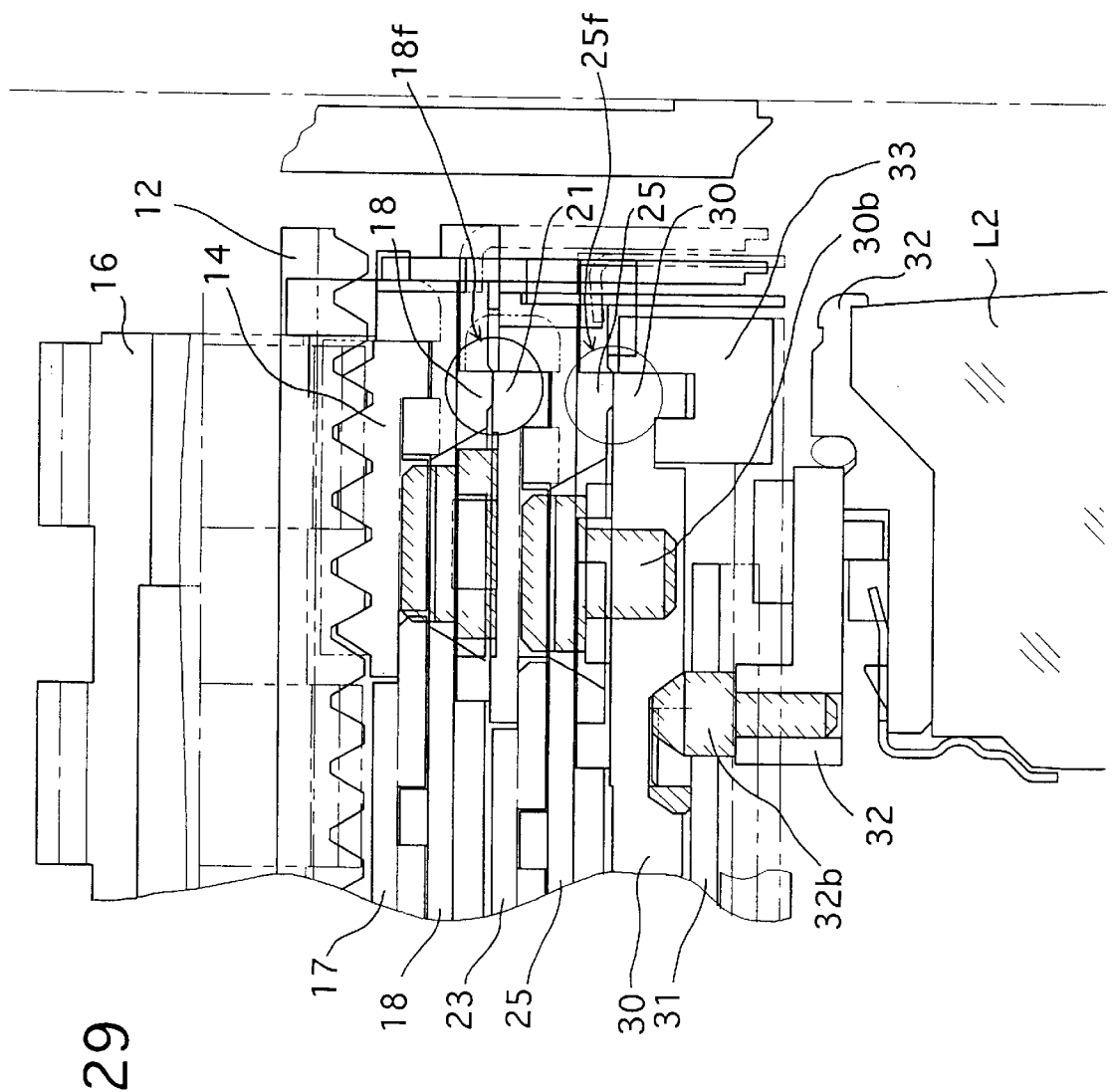
FIG. 29 is a cross-section of the upper half of the zoom lens barrel assembly in the retracted state, in which a circumferential flange is formed on the inner peripheral of the first linear guide ring and on the inner peripheral of the second linear guide ring, near the respective rear ends thereof.
Figure 30:
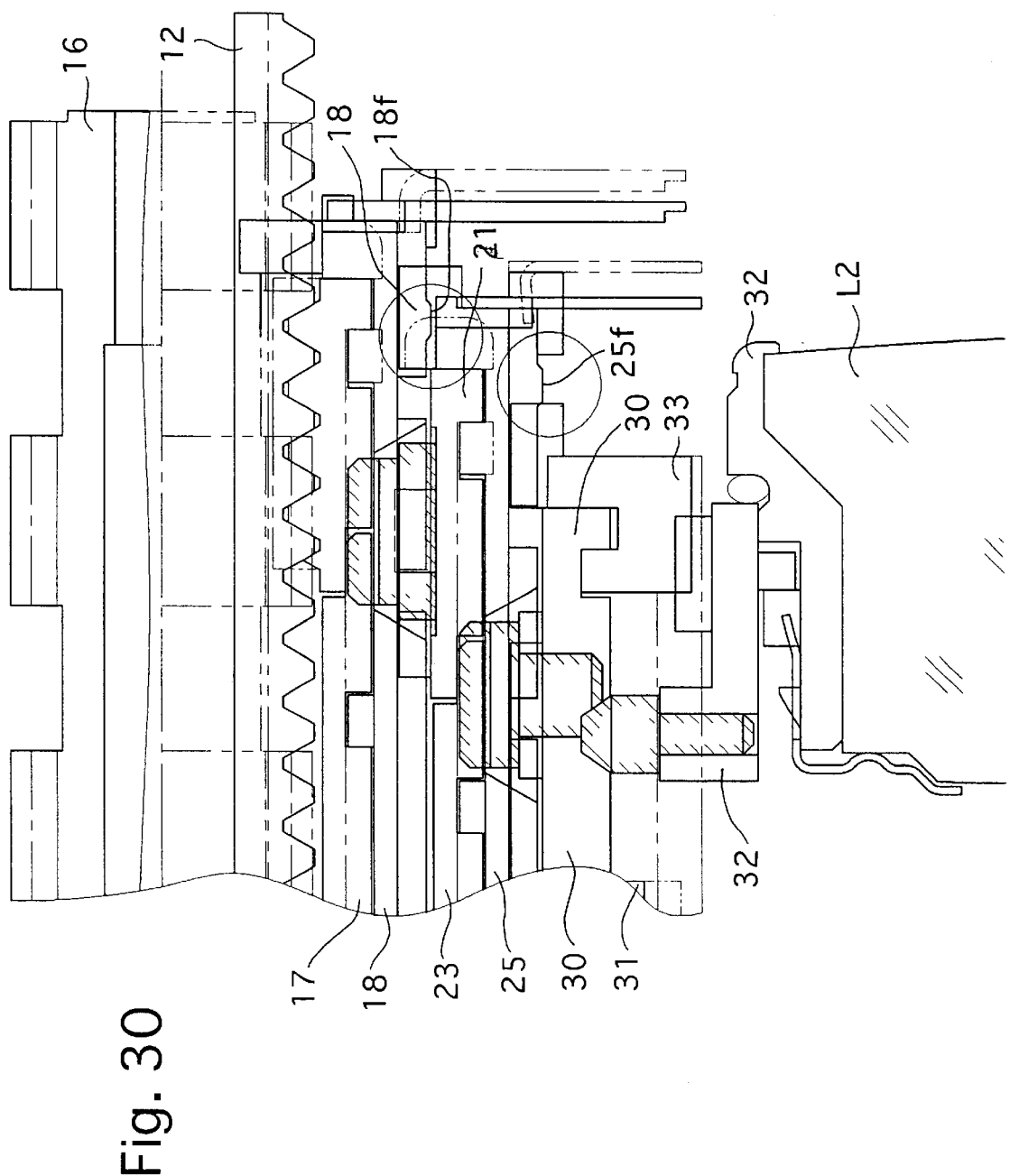
FIG. 30 is a cross-section of the upper half of the zoom lens barrel assembly in a photographing position at the wide-angle extremity, in which a circumferential flange is formed on the inner peripheral of the first linear guide ring and on the inner peripheral of the second linear guide ring, near the respective rear ends thereof.

When the male helicoids 21$a$ proceed from the helicoid slip sections 18$b$1 into the female helicoids 18$b$, if the second helicoid ring 21 and the first linear guide ring 18 are not coaxially aligned or inclined with respect to each other, the end surfaces of the male helicoids 21$a$ may catch on the thrust surfaces 18$b$2, preventing the male helicoids 21$a$ from proceeding into the female helicoids 18$b$. In order to prevent such a problem, an embodiment of the present invention includes flanges (eccentricity-preventing members) 18$f$ and 25$f$ to eliminate eccentricity. The flanges 18$f$ and 25$f$ are formed on the inner peripheries of the first linear guide ring 18 and the second linear guide ring 25, respectively, near the rear ends of the respective guide rings (see FIGS. 18A and 18B). The radial flanges 18$f$ and 25$f$ slidably engage with, and close the end of, the second helicoid ring 21 and the third outer barrel 30, respectively, when the second helicoid ring 21 and the third outer barrel 30 are retreated to their respective retracted positions (see FIG. 29). In this state, the second helicoid ring 21 and the third outer barrel 30 rotate through the slip sections while sliding against the flanges 18$f$ and 25$f$, respectively. In this manner, backlash between the second helicoid ring 21 and the third outer barrel 30 is prevented even when the rings are moving through the slip sections.

Although in this embodiment, the flanges 18f and 25f are provided on the inner peripheries of the first linear guide ring 18 and the second linear guide ring 25, respectively, similar structures with functions similar to the flanges 18f and 25f, such as projections, may be provided on the inner peripheries of the second helicoid ring 21 and the third outer barrel 31. An alternative construction is possible wherein the bottom of the helicoid slip regions 18b1 (25b1) can be gradually raised so that the helicoid slip regions 18b1 (25b1) have a largest depth at a boundary region 18b3 (25b3) and have a smallest depth at a slip boundary region 18b4 (25b4), as shown in FIG. 28C.

According to the above description, the zoom lens barrel assembly of the present invention, in which telescopic movement of the lens barrels is restricted by a stopper member engaging an end tooth of gear teeth on the helicoid ring, provides a simple stopper construction for the lens barrels with fewer components. This construction also facilitates disassembly of the zoom lens barrel assembly since the helicoid ring can be rotated past the normal operative position to the disassembly position by simply removing the stopper member.

Furthermore, the interference-preventing member prevents the flexible printed circuit board from interfering with the gear teeth of the helicoid ring even when the FPC is placed close to the path of the end tooth of the gear teeth of the helicoid ring.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A stopper structure for use in a lens barrel assembly, said lens barrel assembly including a helicoid ring, said helicoid ring comprising:
    a male helicoid provided on an outer periphery of said helicoid ring for engaging with a female helicoid provided on an inner periphery of a fixed barrel secured to a camera body; and
    gear teeth formed along the male helicoids to extend between the male helicoids, said gear teeth being arranged in a circumferential direction about an optical axis, and said helicoid ring moving along the optical axis while been driven by a pinion which is engaged with said gear teeth;
    wherein said stopper structure includes a stopper member which engages with at least one tooth of said gear teeth in order to prevent rotation of said helicoid ring.

2. The stopper structure for use in a lens barrel assembly according to claim 1, wherein rotation of said helicoid ring is prevented when said helicoid ring advances as far as possible in the optical axis direction and said at least one tooth comes into engagement with said stopper member.

3. The stopper structure for use in a lens barrel assembly according to claim 1, wherein the stopper member is removably attached to an outer surface of said fixed barrel.

4. The stopper structure for use in a lens barrel assembly according to claim 1, wherein a portion of said stopper member, which engages with said at least one tooth of said gear teeth of said helicoid ring, projects into said fixed barrel.

5. The stopper structure for use in a lens barrel assembly according to claim 1, wherein an end tooth of said gear teeth constitutes said at least one tooth.

6. The stopper structure for use in a lens barrel assembly according to claim 5, wherein a stopper space is provided in the vicinity of the end of said gear teeth to ensure a large contact width between said stopper member and said at least one tooth.

7. The stopper structure for use in a lens barrel assembly according to claim 1, further comprising:
    a barrel which includes an electric member that moves along the optical axis without rotating as said helicoid ring rotates and moves along the optical axis;
    a flexible printed circuit board for connecting said electric member to an external control circuit arranged outside said lens barrel assembly, said circuit board including folds and being arranged along the optical axis and along an outer periphery of the helicoid ring; and
    an interference-preventing projection for sliding against said flexible printed circuit board to lift said flexible printed circuit in an outward radial direction, with respect to a rotational center of said barrel, in order to prevent said at least one tooth of the helicoid ring interfering with said flexible printed circuit board as said helicoid ring rotates and moves along the optical axis.

8. The stopper structure for use in a lens barrel assembly according to claim 7, wherein said electric member comprises a shutter unit.

9. The stopper structure for use in a lens barrel assembly according to claim 7, wherein said electric member comprises a diaphragm unit.

* * * * *